United States Patent
Yamaguchi et al.

(10) Patent No.: US 9,398,621 B2
(45) Date of Patent: Jul. 19, 2016

(54) STORAGE MEDIUM STORING INFORMATION PROCESSING PROGRAM, INFORMATION PROCESSING SYSTEM, INFORMATION PROCESSING APPARATUS AND METHOD FOR PROCESSING CONNECTION REQUESTS TO ESTABLISH CONNECTION TO ACCESS POINTS FROM A PLURALITY OF PROGRAMS

(75) Inventors: Takahiro Yamaguchi, Kyoto (JP); Kazutomo Niwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 257 days.

(21) Appl. No.: 13/096,275

(22) Filed: Apr. 28, 2011

(65) Prior Publication Data

US 2012/0218909 A1    Aug. 30, 2012

(30) Foreign Application Priority Data

Feb. 25, 2011    (JP) .................................. 2011-040460

(51) Int. Cl.
| | |
|---|---|
| H04W 4/00 | (2009.01) |
| H04W 76/02 | (2009.01) |
| H04W 48/18 | (2009.01) |
| H04W 88/08 | (2009.01) |

(52) U.S. Cl.
CPC .............. *H04W 76/02* (2013.01); *H04W 48/18* (2013.01); *H04W 88/08* (2013.01)

(58) Field of Classification Search
USPC ............. 711/158; 345/581, 629, 632; 463/33, 463/34; 370/235, 329, 315, 462, 252, 352; 709/223, 203, 204, 227, 228; 710/241; 455/435.3, 556.1, 557, 552.1; 713/1, 713/100, 2; 718/100, 107
See application file for complete search history.

(56) References Cited

U.S. PATENT DOCUMENTS

| | | | | | |
|---|---|---|---|---|---|
| 4,799,872 | A | * | 1/1989 | Dowdle | ........................... 425/63 |
| 5,872,872 | A | * | 2/1999 | Kajiwara | ....................... 382/296 |
| 7,474,671 | B2 | * | 1/2009 | Liang | .................. H04W 76/066 370/462 |
| 7,751,348 | B2 | * | 7/2010 | Shaffer et al. | ................. 370/260 |
| 7,990,998 | B2 | * | 8/2011 | Prakash et al. | ................ 370/450 |
| 8,238,911 | B2 | * | 8/2012 | D'Amore | .............. G06F 9/5011 455/435.3 |
| 8,363,102 | B1 | * | 1/2013 | Kadoch et al. | ................. 348/148 |
| 2003/0214928 | A1 | * | 11/2003 | Chuah | ........................... 370/336 |
| 2008/0025268 | A1 | * | 1/2008 | Honary | ................ H04B 7/0417 370/338 |
| 2008/0177994 | A1 | * | 7/2008 | Mayer | ............................. 713/2 |
| 2008/0250478 | A1 | * | 10/2008 | Miller | ....................... H04L 9/32 726/5 |

(Continued)

FOREIGN PATENT DOCUMENTS

| | | |
|---|---|---|
| JP | 10-210177 | 8/1998 |
| JP | 2008-168013 | 7/2008 |
| WO | WO 2010/041412 A1 | 4/2010 |

*Primary Examiner* — Phuongchau Ba Nguyen
(74) *Attorney, Agent, or Firm* — Nixon & Vanderhye, P.C.

(57) ABSTRACT

An information processing program for controlling an information processing apparatus capable of executing at least first and second programs in parallel is provided. The information processing program includes: reception instructions for receiving a connection request for connection to an access point from the first and/or second program(s); determination instructions for comparing information of the received connection request with information of connection status to the access point, and thereby determining whether or not that one of the first and second programs which made the connection request is to be connected to the access point; and connection processing instructions for performing a process for connecting the program that made the connection request to the access point, based on the result of determination.

23 Claims, 23 Drawing Sheets

(56) References Cited

U.S. PATENT DOCUMENTS

| | | | |
|---|---|---|---|
| 2009/0124284 A1* | 5/2009 | Scherzer et al. | 455/552.1 |
| 2010/0115278 A1* | 5/2010 | Shen et al. | 713/171 |
| 2010/0177711 A1* | 7/2010 | Gum | 370/329 |
| 2010/0318913 A1* | 12/2010 | Cupala et al. | 715/719 |
| 2011/0060839 A1* | 3/2011 | Ohta et al. | 709/229 |
| 2011/0064309 A1* | 3/2011 | Sadasue et al. | 382/173 |
| 2011/0176417 A1* | 7/2011 | Kuwabara | 370/230 |
| 2011/0205953 A1* | 8/2011 | Kuwahara | H04W 48/18 370/315 |
| 2011/0250920 A1 | 10/2011 | Shimizu et al. | |
| 2011/0307884 A1* | 12/2011 | Wabe et al. | 717/178 |

* cited by examiner

FIG.7
INFORMATION OF CONNECTION REQUEST FROM PROGRAM

| ITEM | AP TYPE | CONNECTION LEVEL | POWER SAVE MODE | PRIORITY | REQUEST SOURCE PROCESS TYPE | ESSID | AP NUMBER |
|---|---|---|---|---|---|---|---|
| PARAMETER | ALL | WAN | ON | FOREGROUND | APPLICATION | | |
| | NETWORK ZONE | LAN | OFF | BACKGROUND | APPLET | | |
| | . | AUTO | | | APPLICATION B | | |
| | . | | | | APPLICATION S | | |
| | . | | | | . | | |
| | | | | | . | | |
| | | | | | . | | |

FIG.8

INFORMATION OF CONNECTION STATUS TO ACCESS POINT

| ITEM | AP TYPE | CONNECTION LEVEL | POWER SAVE MODE | PRIORITY | ACCESS LIMITATION | ESSID | AP NUMBER |
|---|---|---|---|---|---|---|---|
| PARAMETER | NETWORK SETTING 1 | WAN | ON | FOREGROUND | BACKGROUND INHIBITED | | |
| | NETWORK ZONE | LAN | OFF | BACKGROUND | APPLICATION S INHIBITED | | |
| | PUBLIC WIRELESS LAN | | | | | | |
| | . | . | | | . | | |
| | . | . | | | . | | |
| | . | . | | | . | | |

STORAGE MEDIUM STORING INFORMATION PROCESSING PROGRAM, INFORMATION PROCESSING SYSTEM, INFORMATION PROCESSING APPARATUS AND METHOD FOR PROCESSING CONNECTION REQUESTS TO ESTABLISH CONNECTION TO ACCESS POINTS FROM A PLURALITY OF PROGRAMS

This nonprovisional application is based on Japanese Patent Application No 2011-040460 filed with the Japan Patent Office on Feb. 25, 2011, the entire contents of which are hereby incorporated by reference.

BACKGROUND OF THE INVENTION

1. Field of the Invention

The present invention relates to a recording medium storing an information processing program, an information processing system, an information processing apparatus and a method, for processing connection requests to establish connection to access points from a plurality of programs. Specifically, the present invention relates to a technique enabling connection between a plurality of programs and a plurality of access points of different types having different connection levels.

2. Description of the Background Art

With rapid development of information and communication technology of recent years, various information processing apparatuses using a network communication function have come to be practically used. By way of example, Japanese Patent Laying-Open No. 2008-168013 discloses a game machine that outputs, when it is held by a player and moved to a communication range of an access point (hereinafter also denoted as "AP") and receives a beacon signal output from the access point, an alarm sound informing that a character has been "found."

When the player presses a prescribed operation button and thereby an analysis start instruction is input to the game machine, the game machine displays a display screen representing that analysis is being done and a message to the player urging "movement to a safe location," so as to give a dramatic expression that the found character is being "analyzed," for a prescribed time period of analysis. Thereafter, the game machine displays the found character on the display screen.

Known configurations to connect to an access point include, in addition to wireless LAN, configurations using a so-called cellular wireless communication technique such as a portable telephone and PHS (Personal Handy phone System) and configurations using infrared communication.

When the game machine disclosed in Japanese Patent Laying-Open No. 2008-168013 is to establish connection to an access point by utilizing the network communication function, it has been necessary to process a connection request to connect to the access point.

Along with the development of information processing technique, information processing apparatuses including game machines come to be able to save and execute a plurality of programs. When a plurality of programs are executed, connection requests are output from the plurality of programs, respectively, and it becomes necessary to process the plurality of connection requests one after another and to connect the programs to the access points one after another.

SUMMARY OF THE INVENTION

The present invention was made to solve such a new problem and its object is to provide a storage medium storing an information processing program, an information processing system, an information processing apparatus and a method, for processing connection requests for connection to access points from a plurality of programs enabling connection between the programs and the access points.

According to a first aspect, the present invention provides a non-transitory storage medium encoded with a computer readable information processing program, executable by a computer of an information processing apparatus, the information processing apparatus capable of executing at least first and second programs in parallel. The information processing program includes: reception instructions for receiving a connection request for connection to an access point from the first and/or second program(s); determination instructions for comparing information of the received connection request with information of connection status to the access point, and thereby determining whether or not that one of the first and second programs which made the connection request is to be connected to the access point; and connection processing instructions for performing a process for connecting the program that made the connection request to the access point, based on the result of the determination.

According to the first aspect, the received information of connection request is compared with the information of connection status of the access point, and the process for connecting the program that made the connection request to the access point is executed or not executed depending on the result of determination. Therefore, even when connection requests are output from a plurality of programs, it is possible for the information processing program to process the connection requests from the plurality of programs and to establish connection to the access points, by controlling the computer of information processing apparatus.

According to a second aspect of the present invention, the determination instructions include instructions for determining, when the first program is connected to the access point, whether the second program is to be connected to the access point, in response to a connection request from the second program for connection to the access point.

According to the second aspect of the present invention, it is possible to determine whether the program that has newly requested connection and the access point are to be connected or not, in response to the connection request.

According to a third aspect of the present invention, the determination instructions include instructions for comparing type of access point included in the information of connection request with type of access point included in the information of connection status, and thereby determining whether the second program is to be connected to the access point.

According to the third aspect of the present invention, by the execution of determination instructions, the type of access point included in the information of connection request is compared with the type of access point included in the information of connection status. Therefore, it is possible to determine whether the program that has newly requested connection and the access point are to be connected or not, in accordance with the type of access point that has already been connected.

According to a fourth aspect of the present invention, the connection processing instructions include instructions for notifying, when the second program is connected to the access point, the second program of the connection to the access point.

According to the fourth aspect of the present invention, by the execution of connection processing instructions, notice of connection to the access point is given to the program that requested the connection. Therefore, it is possible for the program that requested the connection to confirm whether or not the connection request is successfully satisfied. Thus, the program that requested the connection can proceed to a process for transmission/reception with the access point.

According to a fifth aspect of the present invention, the information processing program further includes: disconnection determination instructions for determining, when the first program is connected to a first access point, whether a process for disconnecting connection between the first program and the first access point is to be performed, in response to a connection request from the second program for connecting to a second access point; and disconnection processing instructions for performing a process for disconnecting the connection between the first program and the first access point based on a result of execution of the disconnection determination instructions.

According to the fifth aspect of the present invention, the process for disconnection from the access point is executed or not executed depending on the result of execution of the disconnection determination instructions. Therefore, even when a connection request for connection to a new access point is output from a program, it is possible for the information processing program to disconnect the already established connection to the access point.

According to a sixth aspect of the present invention, the connection processing instructions include instructions for performing a process for connecting the second program and the second access point, after the process for disconnecting the connection between the first program and the first access point is done by the execution of the disconnection processing instructions.

According to the sixth aspect of the present invention, it is possible to avoid overlapping of the connection between the first program and the first access point and the connection between the second program and the second access point.

According to a seventh aspect of the present invention, the information processing program further includes second disconnection processing instructions for performing, when the first and second programs are connected to the access point, a process for disconnecting the connection from the access point, in response to disconnection requests for disconnecting the connection to the access point, from the first and second programs.

According to the seventh aspect of the present invention, connection to the access point can be maintained until disconnection requests for disconnecting the connections to the access points are made from all the programs.

According to an eighth aspect of the present invention, the determination instructions are adapted to compare, when the first program is connected to the access point, in response to a connection request from the second program for connection to the access point, priority of the second program included in the information of connection request with priority of the first program included in the information of connection status, and thereby determine whether the second program is to be connected to the access point.

According to the eighth aspect of the present invention, the priority of the program included in the information of connection request is compared with the priority of the program included in the information of connection status, and thereby it is possible to determine whether or not the program that has newly requested connection is to be connected to the access point.

According to a ninth aspect of the present invention, the determination instructions are adapted to determine priority of the first and second programs depending on whether a program is running on a background of the computer or on a foreground of the computer, and to give higher priority to the program running on the foreground of the computer than the program running on the background of the computer.

According to the ninth aspect of the present invention, a program running on the foreground of the computer is given higher priority than the program running on the background of the computer. The program running on the foreground is more easily recognized by the user than the program running on the background and, therefore, it is possible to connect the program to the access point as intended by the user.

According to a tenth aspect of the present invention, the determination instructions include instructions for giving higher priority, if the first and second programs are both programs running on the background of the computer or both programs running on the foreground of the computer, to that program which is connected to the access point later.

According to the tenth aspect of the present invention, among the programs running on the background of the computer, or among the programs running on the foreground of the computer, priority is given to the program that is connected to the access point later.

According to an eleventh aspect of the present invention, the determination instructions include: instructions for determining, when the first program running on the foreground is connected to the access point, in response to a connection request from the second program running on the background for connection to the access point, type of access point included in the information of connection request; and instructions for determining, if the type of access point included in the information of connection request does not include the type of access point included in the information of connection status, not to connect the second program to the access point.

According to the eleventh aspect of the present invention, if the type of access point included in the information of connection request does not include the type of access point included in the information of connection status, the program running on the background is not connected to an access point that is connected to a program running on the foreground.

According to a twelfth aspect of the present invention, the determination instructions include: instructions for determining, when the first program running on the foreground is connected to the access point, in response to a connection request from the second program running on the background for connection to the access point, type of access point included in the connection request; and instructions for determining, when the type of access point included in the information of connection request includes the type of access point included in the information of connection status, to connect the second program to the access point.

According to the twelfth aspect of the present invention, if the type of access point included in the information of connection request includes the type of access point included in the information of connection status, the program running on the background is connected to the access point that is connected to a program running on the foreground.

According to a thirteenth aspect of the present invention, the determination instructions include: instructions for determining, when the first program running on the background is connected to the access point, in response to a connection request from the second program running on the foreground for connection to the access point, type of access point included in the information of connection request; and instructions for determining, when the type of access point included in the information of connection request does not include the type of access point included in the information of connection status, to connect the second program to the access point.

According to the thirteenth aspect of the present invention, if the type of access point included in the information of connection request does not include the type of access point included in the information of connection status, connection between the program running on the background and the access point is disconnected, and the program running on the foreground is connected to the new access point.

According to a fourteenth aspect of the present invention, the determination instructions include: instructions for determining, when the first program running on the background is connected to the access point, in response to a connection request from the second program running on the foreground for connection to the access point, type of access point included in the information of connection request; and instructions for determining, when the type of access point included in the information of connection request includes the type of access point included in the information of connection status, to connect the second program to the access point.

According to the fourteenth aspect of the present invention, if the type of access point included in the information of connection request includes the type of access point included in the information of connection status, the program running on the foreground is connected to the access point connected to the program running on the background.

According to a fifteenth aspect of the present invention, the disconnection determination instructions include instructions for comparing, when the first program is connected to the access point, in response to a connection request from the second program for connection to the access point, priority of the second program included in the information of connection request with priority of the first program included in the information of connection status, and thereby determining whether the first program is to be disconnected from the access point.

According to the fifteenth aspect of the present invention, the priority included in the information of connection request is compared with the priority of the program included in the information of connection status, and thereby it is possible to determine whether or not the already established connection between the program and the access point is to be disconnected.

According to a sixteenth aspect, the present invention provides an information processing apparatus capable of executing at least first and second programs in parallel. The information processing apparatus includes: a reception unit for receiving a connection request for connection to an access point from the first and/or second program(s); a determination unit for comparing information of connection request received by the reception unit with information of connection status of the access point, and thereby determining whether that one of the first and second programs which made the connection request is to be connected to the access point; and a connection processing unit for performing a process for connecting the program that made the connection request to the access point, based on a result of determination by the determination unit.

According to the sixteenth aspect of the present invention, the received information of connection request is compared with the information of connection status to the access point, and based on the result of determination, the process for connecting the program that made the connection request to the access point is executed. Therefore, even when connection requests are made by a plurality of programs, it is possible for the information processing apparatus to process the connection requests from the plurality of programs and to establish connection to the access point.

According to a seventeenth aspect, the present invention provides an information processing system capable of executing at least first and second programs in parallel. The information processing system includes: a reception unit for receiving a connection request for connection to an access point from the first and/or second program(s); a determination unit for comparing information of connection request received by the reception unit with information of connection status of the access point, and thereby determining whether that one of the first and second programs which made the connection request is to be connected to the access point; and a connection processing unit for performing a process for connecting the program that made the connection request to the access point, based on a result of determination by the determination unit.

According to the seventeenth aspect of the present invention, the received information of connection request is compared with the information of connection status to the access point, and based on the result of determination, the process for connecting the program that made the connection request to the access point is executed. Therefore, even when connection requests are made by a plurality of programs, it is possible for the information processing apparatus to process the connection requests from the plurality of programs and to establish connection to the access points.

According to an eighteenth aspect, the present invention provides, in an information processing apparatus capable of executing at least first and second programs in parallel, a method including the steps of: receiving a connection request for connection to an access point from the first and/or second program(s); comparing information of connection request received at the reception step with information of connection status of the access point, and thereby determining whether that one of the first and second programs which made the connection request is to be connected to the access point; and performing a process for connecting the program that made the connection request to the access point, based on a result of determination at the determining step.

According to the eighteenth aspect of the present invention, the received information of connection request is compared with the information of connection status to the access point, and thereby it is determined whether or not the program that made the connection request of the first and second programs is to be connected to the access point. Based on the result of determination, the process for connecting the program that made the connection request to the access point is executed. Therefore, even when connection requests are made by a plurality of programs, it is possible to process the connection requests from the plurality of programs and to establish connection to the access point.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows items included in the information of connection request from a program and parameters for the items.

FIG. 8 shows items included in the information of connection status to an access point and parameters for the items.

DESCRIPTION OF THE PREFERRED EMBODIMENTS

Figure 1:
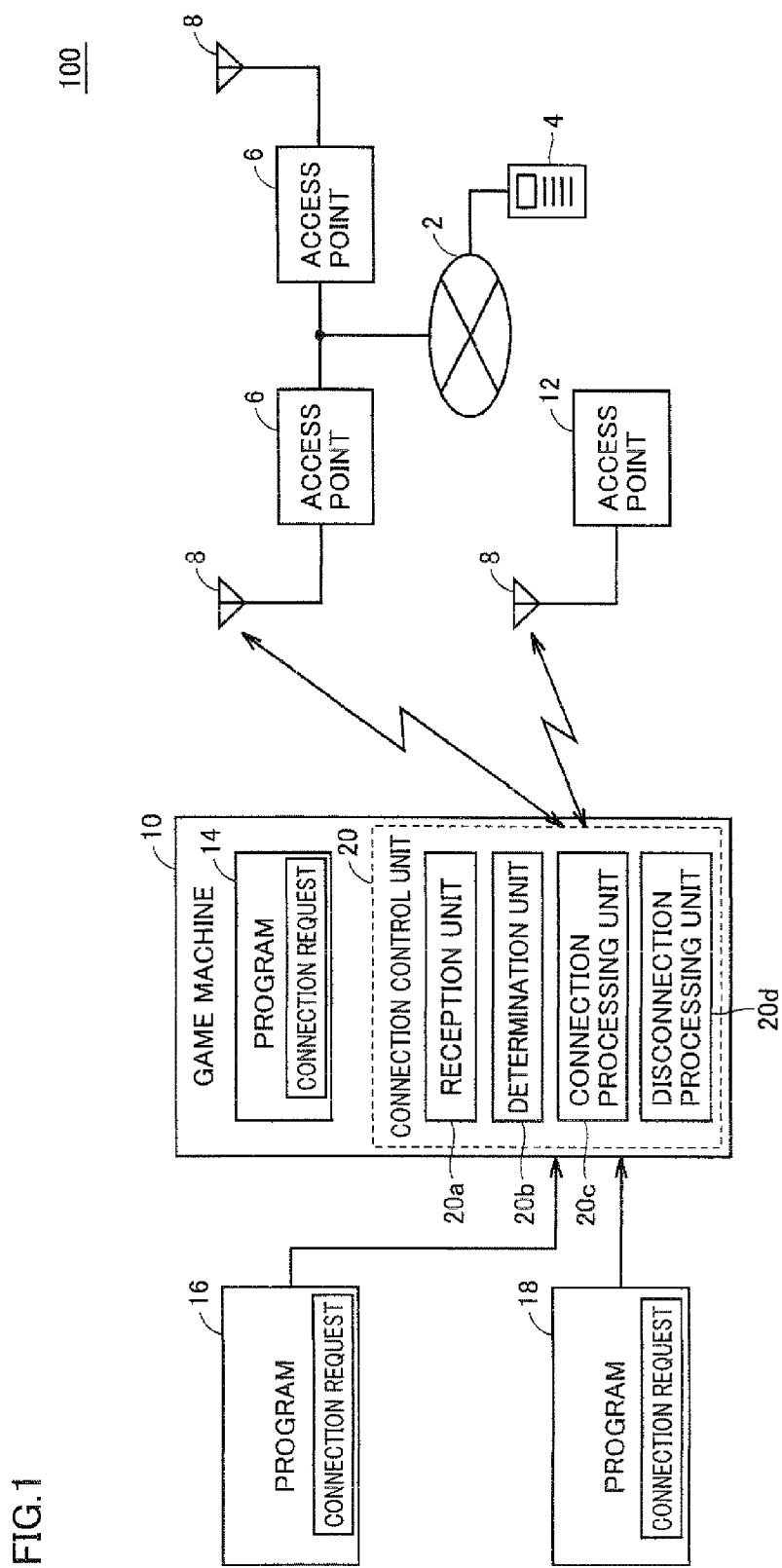
FIG. 1 shows a schematic configuration of a network system in accordance with an embodiment of the present invention.

Embodiments of the present invention will be described in detail with reference to the figures. The same or corresponding portions in the figures are denoted by the same reference characters and description thereof will not be repeated.

<A. Outline>

In the present embodiment, a communication control program is considered, which is an information processing program for processing, in a game machine as an information processing apparatus capable of executing at least first and second programs in parallel, when connection requests for establishing connection to a plurality of access points of different types and having different connection levels are output from the first and second programs, the connection requests from the first and second programs and for establishing connection to the access points.

The first and second programs may be applications such as game programs executed in the game machine, or a communication management program managing a communication program for realizing prescribed communication by controlling a communication unit provided in the game machine. The first and second programs may be both programs running on the background, or both programs running on the foreground, of the game machine, or they may be a program running on the background and a program running on the foreground of the game machine, respectively. Here, the program running on the background includes a program that can be executed even when the game machine is in the sleep state (power save mode).

The connection levels of access points include WAN (Wide Area Network) allowing connection to the Internet, and LAN (Local Area Network) not allowing connection to the Internet. The types of access points include network settings as the communication environments (for example, wireless LAN communication) prepared at home or at offices, and a network zone as a communication environment provided by manufacturers of game machines.

<B. System Configuration>

In the following, a typical implementation will be described with reference to FIG. 1. FIG. 1 is a schematic diagram of a network system 100 in accordance with an embodiment of the present invention.

Description will be given assuming that in a network system 100, wireless connection is used for connecting a game machine 10 to a plurality of access points 6 and 12 of different types and different connection levels. Specific methods of communication for wireless connection may include a communication method in compliance with IEEE (the Institute of Electrical and Electronics Engineers, Inc.) 802.11 series standard (hereinafter also referred to as "wireless LAN") and a communication method in compliance with IMT (International Mobile Telecommunications) 2000 standard, that is, a so-called third generation mobile communication system.

The communication methods are not limited to wireless communication methods, and one or both may be wired communication methods. Further, wireless communication methods other than the standards mentioned above, such as PHS (Personal Handy phone System) and WiMAX (Worldwide Interoperability for Microwave Access) may be adopted.

A game machine of any type may be used as the game machine 10 in accordance with the present embodiment, provided that it has the communication function as described above. In place of a computer of a game machine 10, the present invention is also applicable to a general purpose information processing apparatus (typically, a portable personal computer, a portable workstation, a portable terminal, a PDA (Personal Digital Assistance) or a portable telephone). In such a case, an application program is executed as a program that corresponds to the game program, in the information processing apparatus.

A storage medium storing programs 16 and 18 can be attached to game machine 10. Further, a program 14 is stored in the body of game machine 10. Programs 16 and 18 stored in the storage medium may be an application such as a game program executed by game machine 10, or an applet, which is a small program embedded and executed in an application. Program 14 stored in the body of game machine 10 may be a program controlling resources of game machine 10, such as a communication management program. Programs 14, 16 and 18 each have a connection request for establishing connection to an access point.

Network system 100 includes the Internet 2, to which a server 4 and an access point 6 are connected. Therefore, game machine 10 can be connected to server 4 through the Internet 2. Server 4 is typically a device providing various types of network service to game machine 10, such as a Web server, a download server, a server for distributing various contents, a mail server or a search server. Though not shown, communication in network system 100 may be direct communication between game machines 10 (so called peer-to-peer connection), not through the Internet 2.

Access point 6 is a connection control device for providing wireless access in accordance with wireless LAN, and it relays connection from game machine 10 to network 2. Specifically, access point 6 is an access point of WAN that can be connected to the Internet 2. Access point 6 receives, through an antenna 8, a radio signal (for example, in 2.4 GHz band or 5 GHz band) in accordance with wireless LAN transmitted from game machine 10.

Access point 12 is a connection control device for providing wireless access in accordance with wireless LAN, but it does not relay connection from game machine 10 to the Internet 2. Specifically, access point 12 is an access point of LAN that cannot be connected to the Internet 2. Access point 12 also receives, through antenna 8, a radio signal (for example, in 2.4 GHz band or 5 GHz band) in accordance with wireless LAN transmitted from game machine 10.

Game machine 10 is provided with a connection control unit 20 automatically performing a process for connecting programs 14, 16 and 18 to access points 6 and 12, in response to connection requests from programs 14, 16 and 18 for connection to access points 6 and 12. As will be described later, game machine 10 has information of connection status with access points 6 and 12 saved in a memory, to be compared with the connection requests from programs 14, 16 and 18. The information of connection status can be regarded as indicating the connection status between game machine 10 and access points 6 and 12 at a time point when connection request is made from program 14, 16 or 18.

Connection control unit 20 includes a reception unit 20a, a determination unit 20b, a connection processing unit 20c and a disconnection processing unit 20d. Reception unit 20a receives the connection request from programs 14, 16 and 18 for establishing connection to access points 6 and 12. The connection request includes information such as the connection level and the type of access point, as will be described later.

Determination unit 20b determines whether connection between the program that made the connection request among programs 14, 16 and 18 and the access point 6 or 12 is to be established. By way of example, if an already connected access point has the connection level of WAN and the connection level included in the information of connection request from the program to be newly connected is WAN, determination unit 20b connects the program to be newly connected to the access point. Further, if the type of an already connected access point is network setting and the type of access point included in the information of connection request from the program to be newly connected is access points of all types, determination unit 20b connects the program to be newly connected to the access point.

Further, when program 16 is connected to access point 6, determination unit 20b determines whether or not a process for disconnecting the connection between program 16 and access point 6 is to be done, in response to a connection request from program 14 for establishing connection to access point 12.

Connection processing unit 20c performs the process for connecting program 14, 16 or 18 that made the connection request to access point 6 or 12, based on the result of determination by determination unit 20b. By way of example, if determination unit 20b determines that program 16 is to be connected to access point 6, connection processing unit 20c transmits a radio signal from the communication unit of game machine 10 to antenna 8 of access point 6, and thereby connects program 16 to access point 6.

Disconnection processing unit 20d performs the process for disconnecting program 14, 16 or 18 from access point 6 or 12, based on the result of determination by determination unit 20b. By way of example, if determination unit 20d determines that the connection between program 16 and access point 6 is to be disconnected, it stops transmission of the radio signal from the communication unit of game machine 10 to antenna 8 of access point 6, and thereby disconnects connection between program 16 and access point 6.

Further, when programs 16 and 18 are connected to access point 6, disconnection processing unit 20d performs the process for disconnecting the connection between game machine 10 and access point 6, in response to a disconnection request for disconnecting the connection to access point 6, from programs 16 and 18.

<C. Machine Configuration>

In the following, configurations of various machines and devices shown on network system 100 of FIG. 1 will be described.

[c1. Configuration of Game Machine 10]

Figure 2:
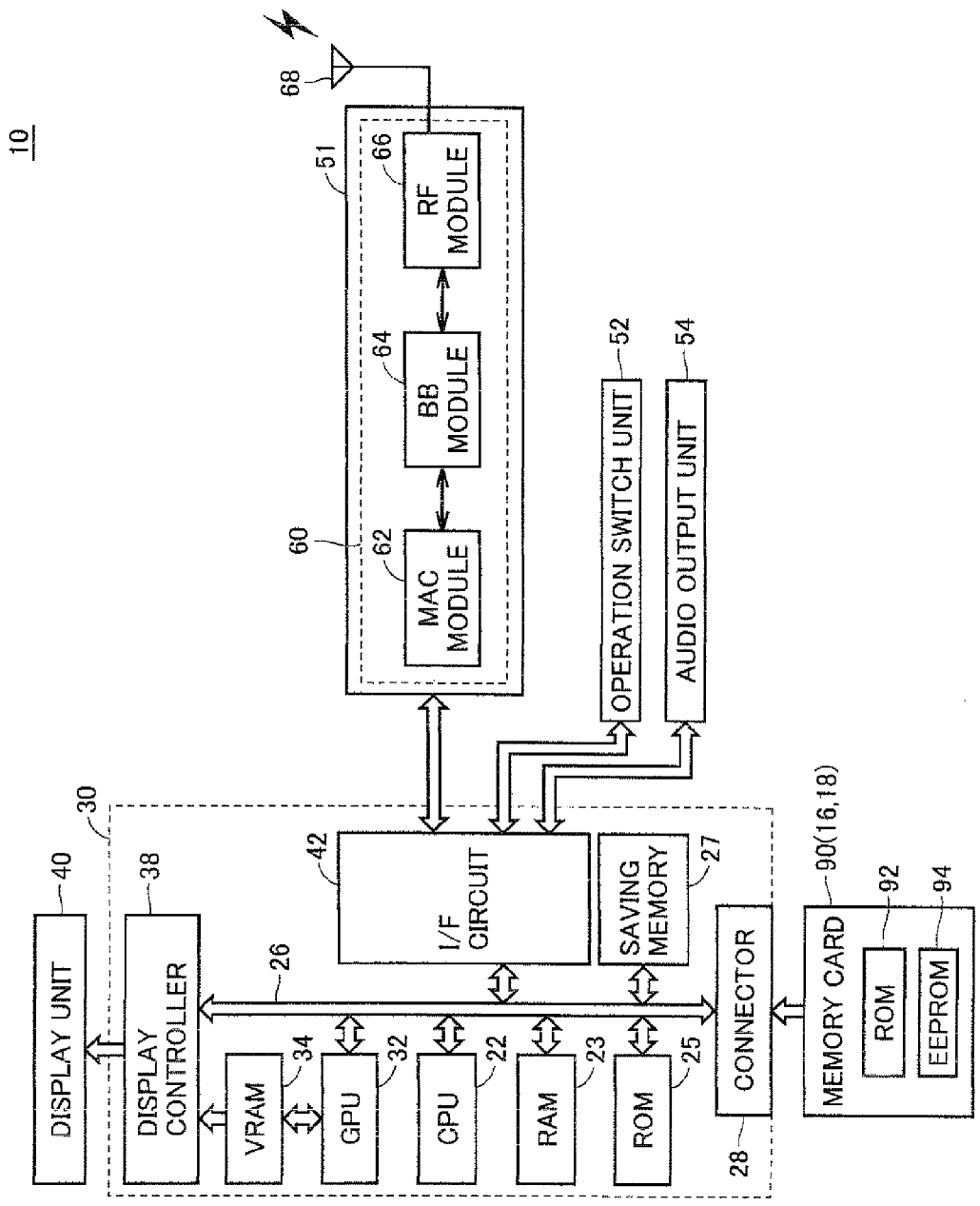
FIG. 2 is a block diagram showing a configuration of a game machine in accordance with the embodiment of the present invention.

FIG. 2 is a block diagram showing a configuration of game machine 10 in accordance with an embodiment of the present invention.

Game machine 10 shown in FIG. 2 includes an electronic circuit board 30 having circuit components mounted thereon, a display unit 40, a communication unit 51, an operation switch unit 52, and an audio output unit 54. Further, a memory card 90 as an example of the storage medium can be attached to game machine 10.

Electronic circuit board 30 is a portion executing various processes in game machine 10, and it includes: a CPU (Central Processing Unit) 22; an RAM (Random Access Memory) 23; an ROM (Read Only Memory) 25; a saving memory 27; a connector 28; a graphic processing unit (GPU, hereinafter also simply referred to as "GPU") 32; a video memory (VRAM: Video Random Access Memory; hereinafter also simply referred to as "VRAM") 34; a display controller 38; and an interface circuit (hereinafter also simply referred to as "I/F circuit") 42. These units are configured to be able to transfer data to each other through a bus 26.

To connector 28, memory card 90 is detachably attached. Memory card 90 includes: an interface circuit, not shown, for electrical contact with connector 28; an ROM 92 having an instruction set (programs 14, 16, 18) fixed for operating CPU 22; and an EEPROM (Electrically Erasable Programmable ROM) 94 for holding information generated in accordance with various processes or information set by a user or the like in a non-volatile manner. The programs 14, 16 and 18 stored in ROM 92 of memory card 90 may be entirely or partially developed on RAM 23 of electronic circuit board 30 as the process is executed. The data held in EEPROM 94 of memory card 90 may be entirely or partially held temporarily in RAM 23, in accordance with the process by CPU 22.

CPU 22 reads necessary program, set data and image/sound data from ROM 92 or EEPROM 94 of memory card 90 connected through connector 28, from ROM 25 or I/F circuit 42, and loads the same to RAM 23. Specifically, RAM 23 is used as a buffer memory and/or a working memory. Then, CPU 22 executes codes of the program loaded to RAM 23, whereby various information processing operations including the communication process as will be described later are executed.

ROM 25 has programs fixed therein to perform basic processes of game machine 10. Specifically, ROM 25 stores a boot program and a resident program of game machine 10. Further, game machine 10 in accordance with the present embodiment stores a communication control program that processes connection requests from a plurality of programs and establishes connection to the access points.

Saving memory 27 is a memory for holding game programs downloaded from server 4 through the Internet 2, and information set by the user or generated in accordance with various processes, in a non-volatile manner. Particularly, saving memory 27 holds information used commonly by the plurality of programs (such as AP number of the access point). Further, saving memory 27 holds information of connection status with access points 6 and 12 as well as information of connection destination, as will be described later.

GPU 32, VRAM 34 and display controller 38 function as a rendering unit for rendering an image on display unit 40. These components may be implemented by using a single chip ASIC (Application Specific Integrated Circuit). More specifically, GPU 32 generates, in response to a graphics command (image forming instruction) applied from CPU 22, image data in accordance with contents to be displayed on display unit 40. The generated image data is successively written to VRAM 34. Display controller 38 outputs a video signal based on the image data written to VRAM 34. It is also possible that CPU 22 provides an image generating program for dynamically generating image data to GPU 32, and GPU 32 generates necessary image data.

Display unit 40 is an interface providing the user with visual information and, typically, a liquid crystal display (LCD), an EL (Electronic Luminescence) display, a plasma display or the like is used. Display unit 40 is capable of displaying three-dimensional video images.

I/F circuit 42 exchanges data to/from CPU 22, communication unit 51, operation switch unit 52 and audio output unit 54.

Operation switch unit 52 is an input unit for receiving a user operation, including buttons, a mouse, a touch panel and the like positioned appropriately as needed. When the user operates operation switch unit 52, an operation signal in accordance with the operation is transmitted through I/F circuit 42 to, for example, CPU 22.

Audio output unit 54 is typically a speaker, and it provides the user with audio information, based on audio data generated by CPU 22. As audio output unit 54, a connector for attaching a headphone may be prepared.

Communication unit 51 provides communication means for connecting to access points 6 and 12 (FIG. 1). Specifically, communication unit 51 provides the communication means in accordance with wireless LAN.

More specifically, communication unit 51 includes a wireless LAN communication unit 60 performing wireless communication with access point 6 (FIG. 1) in accordance with the wireless LAN communication method.

Wireless LAN communication unit 60 includes: a medium access controller (MAC) module (hereinafter also simply referred to as "MAC module") 62; a multiplexer 63; a baseband (BB) module (hereinafter also simply referred to as "BB module") 64; and a radio frequency (RF) module (hereinafter also simply referred to as "RF module") 66.

MAC module 62 is an access controller for transfer control of wireless LAN. MAC module 62 controls transfer of a data packet (frame) to/from access point 6. More specifically, MAC module 62 divides data output from CPU 22 to predetermined data packets and transmits, and couples data packets received from a connection destination through access point 6 to decode to one data block. Further, MAC module 62 performs error detection and error correction of the received data, and resends data of which transmission has failed.

Further, MAC module 62 also has a connection management function, for managing connection to access point 6. By way of example, based on an identifier defined in wireless LAN, MAC module 62 identifies an access point 6 as a relay destination. More specifically, in wireless LAN, connection is controlled using an identifier referred to as an ESSID (Extended Service Set Identifier).

As will be described later, when programs 14, 16 and 18 are to be connected to access point 6, an ESSID indicating the target access point 6 is designated. Then, MAC module 62 searches for an available access point 6, and establishes wireless connection with the access point 6 having the designated ESSID.

Basically, MAC module 62 has a function of determining any access point 6 to be a connection destination for connecting any access point 6 to the Internet 2, based on the identifier (ESSID) provided by access point 6.

At the time of data transmission, BB module 64 encodes a signal (digital data) transmitted from MAC module 62 in accordance with a prescribed processing rule, and generates a baseband signal (modulated signal) representing the encoded data. RF module 66 up-converts the modulated signal received from BB module 64 to a carrier frequency, and thereby generates a radio signal. The radio signal generated by RF module 66 is emitted from an antenna 68.

At the time of data reception, RF module 66 down-converts a radio signal received from access point 6 and whereby generates a baseband signal. BB module 64 decodes the baseband signal received from RF module 66, and extracts only a data packet or packets addressed to it. Further, BB module 64 outputs the extracted data packet to MAC module 62.

Between game machine 10 and access point 6, encrypted communication is possible. Therefore, it is preferred that MAC module 62 supports encrypted communication methods such as WEP, WPA and T-KIP.

Further, part of or all of MAC module 62 may be implemented by a processor (typically a DSP (Digital Signal Processor)) executing processes in accordance with programmed codes. In that case, the program to be executed by the processor may be stored in memory card 90 or in ROM 25, and at the time of activation of game machine 10, the program may be transferred to the processor.

Specifically, the program for connecting to access point 6 using the identifier (ESSID) defied by wireless LAN is stored in memory card 90 or ROM 25, and the stored program is executed by game machine 10 as a computer, whereby the function of connection to access point 6 is provided.

[c2. Configuration of Access Point 6]

Figure 3:
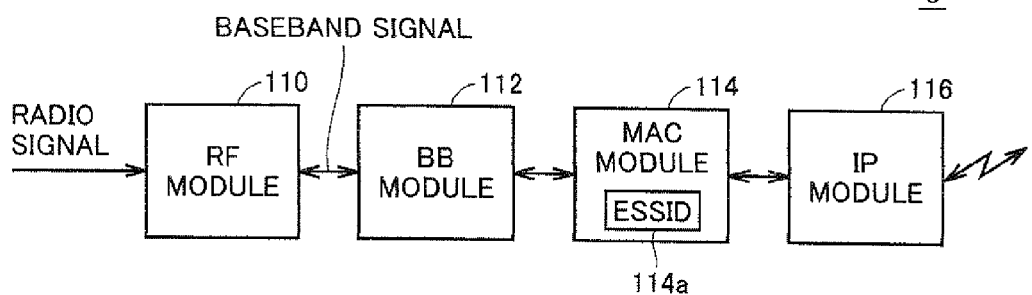
FIG. 3 is a block diagram showing a configuration of an access point in accordance with the embodiment of the present invention.

FIG. 3 is a block diagram showing a configuration of access point 6 in accordance with the embodiment of the present invention.

Referring to FIG. 3, access point 6 receives a radio signal (wireless LAN) transmitted from game machine 10 and transfers data included therein to a connection destination connected to the Internet 2, and based on data received from the connection destination of the Internet 2, transmits a radio signal (wireless LAN) to game machine 10. More specifically, access point 6 includes an RF module 110, a BB module 112, an MAC module 114 and an IP (Internet Protocol) module 116.

Similar to RF module 66 in wireless LAN communication unit 60 shown in FIG. 2, RF module 110 up-converts a baseband signal received from BB module 112 to a radio signal, and down-converts a radio signal received from game machine 10 to a baseband signal.

Similar to BB module 64 in wireless LAN communication unit 60 shown in FIG. 2, BB module 112 encodes a signal (digital data) input from MAC module 62 and generates a baseband signal (modulated signal), and decodes a baseband signal input from RF module 110 and generates a data signal.

Similar to MAC module 62 in wireless LAN communication unit 60 shown in FIG. 2, MAC module 114 is an access controller for controlling transfer in wireless LAN with game machine 10. More specifically, receiving data from a connection destination through IP module 116, MAC module 114 divides the data to predetermined data packets and outputs to BB module 112, and couples data packets received from BB module 112 and decodes to one data block, and outputs it to IP module 116.

MAC module 114 has a register 114a for holding a value of ESSID of its own access point. MAC module 114 reads the value of ESSID stored in register 114a and transmits (broadcasts) a beacon having the read ESSID added thereto. Specifically, MAC module 114 provides game machine 10 with the identifier (ESSID) defined under wireless LAN.

IP module 116 controls data transfer to the connection destination through network 2. Specifically, IP module 116 passes the data to connection destination based on address information described at the header of data packet, in accordance with TCP/IP. Further, IP module 116 arranges data packets passed from the connection destination and outputs the resulting data packets to MAC module 114.

[c3. Configuration of Access Point 12]

The configuration of access point 12 is the same as that of access point 6 shown in FIG. 3, except that IP module 116 controls data transfer to/from the connection destination through a local network, rather than the Internet 2. Therefore, detailed description of the configuration of access point 12 will not be repeated.

<D. Data structure>

Next, programs and data usable by game machine 10 in accordance with the present embodiment will be described. Game machine 10 develops the program or data having the data structure as will be described in the following on RAM 23, and executes the program.

Figure 4:
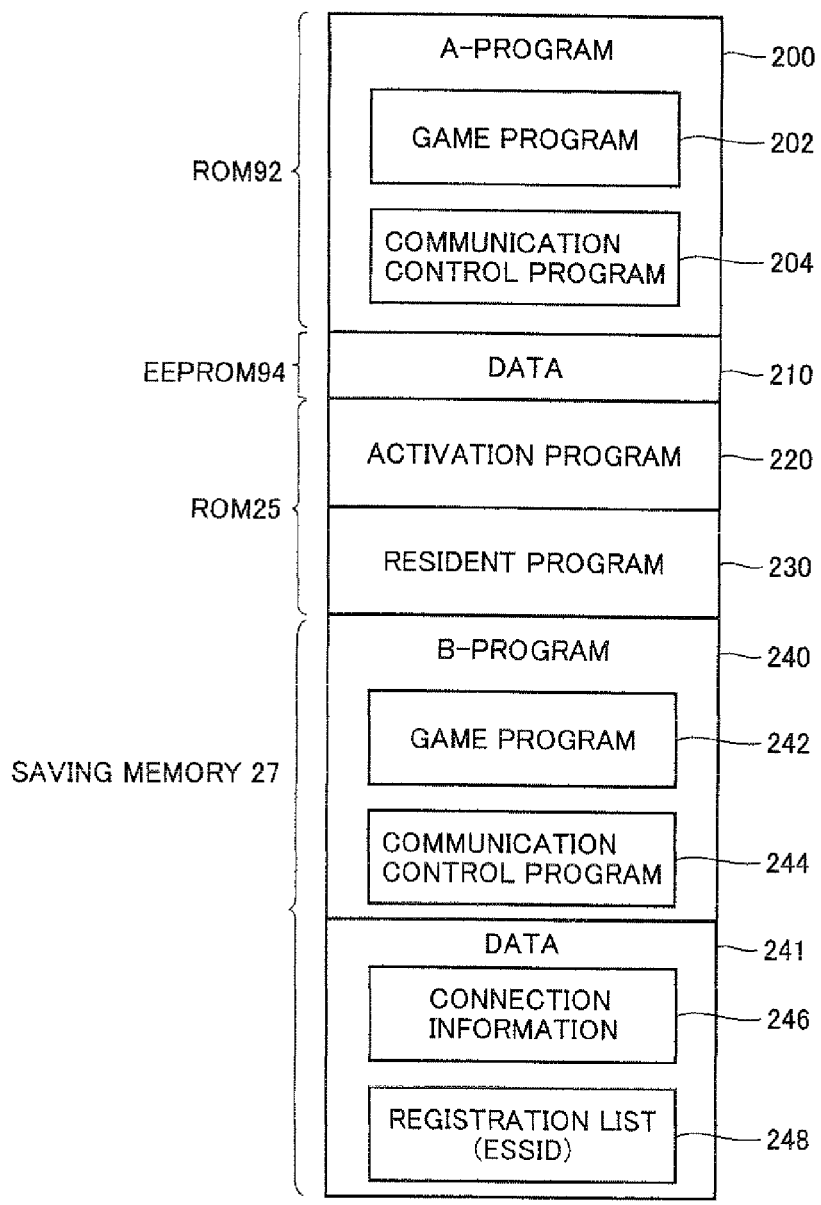
FIG. 4 is a schematic diagram structurally showing the programs and data usable when a program that supports wireless LAN is executed in a conventional game machine.

Before describing the data structure of game machine 10 in accordance with the present embodiment, the data structure of a conventional game machine will be described. FIG. 4 is a schematic diagram structurally showing the programs and data that can be used when a program that supports wireless LAN is executed by a conventional game machine. For easier comparison with the data structure of game machine 10 in accordance with the present embodiment, the data structure shown in FIG. 4 will be described using the structure and reference characters of game machine 10 shown in FIG. 2.

ROM 92 of memory card 90 shown in FIG. 4 stores A-program 200. A-program 200 includes a game program 202 providing various information processing operations, and a communication control program 204 for using wireless LAN communication unit 60 (FIG. 2).

Further, EEPROM 94 of memory card 90 stores data 210 necessary for executing game program 202.

Further, ROM 25 of game machine 10 stores programs for performing basic processes even when memory card 90 is not attached. These programs correspond to a sort of OS (Operating System). Specifically, ROM 25 of game machine 10 stores a boot program 220 for performing initial operation after power-on of game machine 10, and a resident program 230 for executing processes necessary for various events after power-on. Specifically, when game machine 10 is powered on, CPU 22 performs necessary initial process in accordance with boot program 220 and, thereafter, determines whether or not any event such as a user operation has occurred as needed and executes a process required upon occurrence of an event, in accordance with resident program 230.

Further, saving memory 27 stores B-program 240. B-program 240 includes a game program 242 providing various information processing operations, and a communication control program 244 for using wireless LAN communication unit 60 (FIG. 2).

Further, saving memory 27 contains connection information 246 including past communication logs and passwords, and data 241 of registration list 248 including information of connection destinations. Registration list 248 includes an identifier (ESSID) defined by wireless LAN set in advance by the user as a candidate of connection destination. In accordance with the value of ESSID registered in registration list 248, the access point by wireless LAN is determined.

As A-program 200 stores communication control program 204 and B-program 240 stores communication control program 244, respectively, connection requests for connection to a plurality of access points of different types and different connection levels are output from A-program 200 and B-program 240, and it has been necessary to process the connection requests in the order of reception to connect A-program 200 to access point 6 or 12 and to connect B-program 240 to access point 6 or 12.

If game machine 10 is adapted to process the connection request for connection to access point 6 or 12 at the time of executing a program, it is impossible, for example, to connect B-program 240 to access point 6 or 12 to exchange necessary information while A-program 200 is being executed and B-program is not being executed.

Therefore, in game machine 10 in accordance with the present embodiment, a data structure is adopted, in which a control program controlling communications of game programs 202 and 242 is stored in ROM 25 of game machine 10, rather than storing communication programs 204 and 244 in A-program 200 and B-program 240, respectively.

Figure 5:
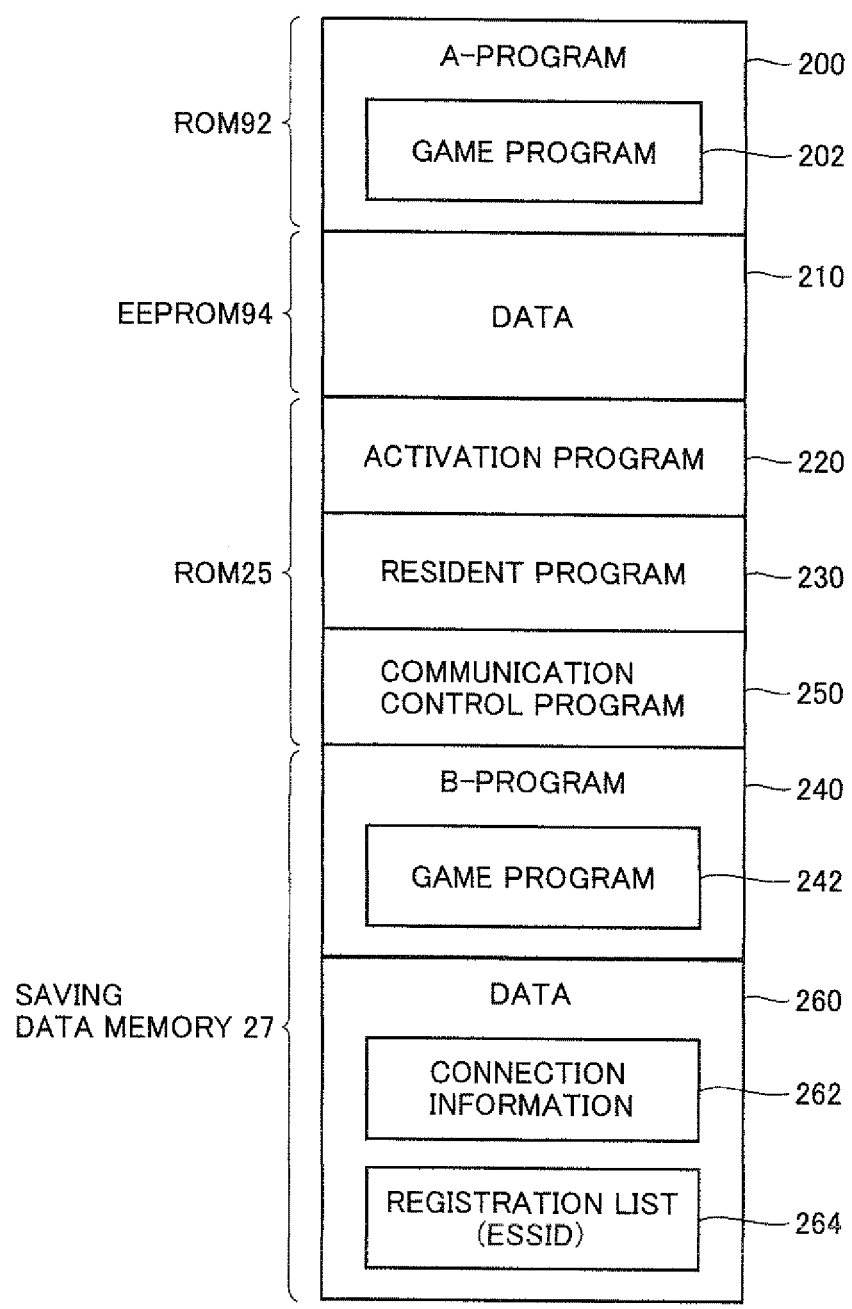
FIG. 5 is a schematic diagram structurally showing the programs and data usable when a program that supports wireless LAN is executed in the game machine in accordance with the embodiment of the present invention.

FIG. 5 is a schematic diagram structurally showing the programs and data usable when a program that supports wireless LAN is executed in game machine 10 in accordance with the embodiment of the present invention.

ROM 92 of memory card 90 shown in FIG. 5 also stores A-program 200. A-program 200 includes game program 202 providing various information processing operations.

Further, EEPROM 94 of memory card 90 stores data 210 necessary for executing game program 202.

Further, ROM 25 of game machine 10 stores programs for performing basic processes even when memory card 90 is not attached. These programs correspond to a sort of OS (Operating System). Specifically, ROM 25 of game machine 10 stores a boot program 220 for performing initial operation after power-on of game machine 10, a resident program 230 for executing processes necessary for various events after power-on, and a communication control program 250 processing connection requests from a plurality of programs and controlling connection between the plurality of programs and the access points.

Further, saving memory 27 stores B-program 240. B-program 240 includes a game program 242 providing various information processing operations.

Further, saving memory 27 of game machine 10 stores data 260 commonly required among the plurality of game programs 202 when the plurality of game programs 202 are executed. Data 260 include connection information 262 including past communication logs, passwords and information of connection status to access points 6 and 12 of each of the game programs 202, and a registration list 264 including information of connection destinations. Registration list 264 includes an identifier (ESSID) defined by wireless LAN set in advance by the user as a candidate of connection destination. In accordance with the value of ESSID registered in registration list 264, the access point by wireless LAN is determined.

<E. Communication Process>

Figure 6:
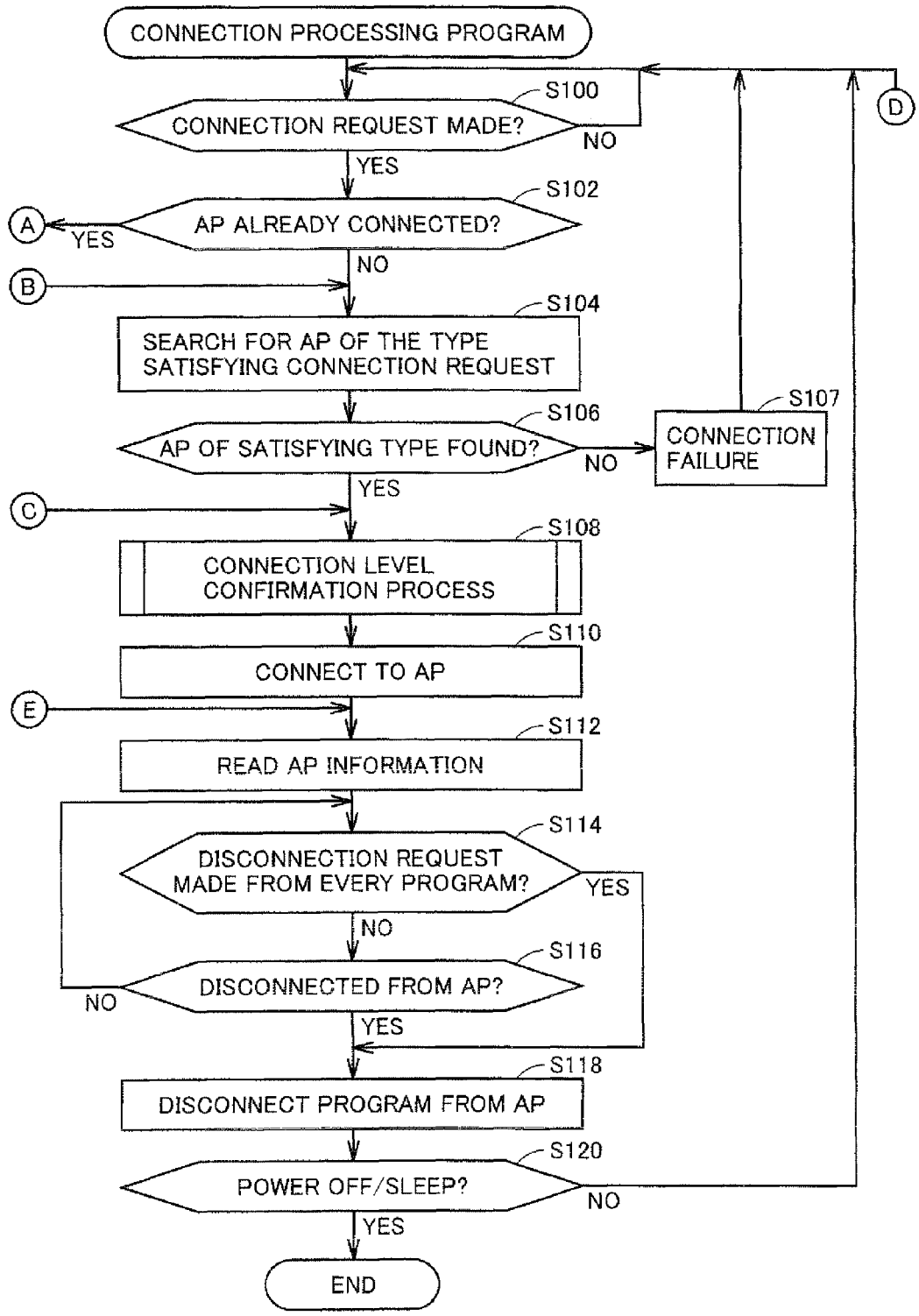
FIG. 6 is a flowchart of a connection control program for connecting programs of a game machine to access points in accordance with the embodiment of the present invention.

Next, an operation when game machine 10 in accordance with the present embodiment processes connection requests from the plurality of programs 14, 16 and 18 and controls connection between the plurality of programs and access points 6 and 12 will be described. FIG. 6 is a flowchart of a connection control program for connecting programs 14, 16 and 18 of game machine 10 to access points 6 and 12 in accordance with the embodiment of the present invention.

[e1. When a Program is to be Connected to an Access Point]

First, CPU 22 executes the connection control program, to activate connection control unit 20. Reception unit 20a of activated connection control unit 20 determines whether or not a connection request for connection to access point 6 or 12 has been received from program 14, 16 or 18 (step S100).

[Connection Request from Program]

Here, the connection request from program 14, 16 or 18 will be described. FIG. 7 shows items included in the information of connection request from programs 14, 16 and 18, and parameters for the items. The items included in the information of connection request from programs 14, 16 and 18 are AP type, connection level, power save mode, priority, request source process type, ESSID and AP number.

"AP type" is an item for designating the type of access point 6 or 12 to which the program is to be connected. The parameters for the AP type include ALL designating all types of access points 6 and 12, and 'network zone' designating a network zone as a communication environment provided by the manufacturer of the game machine.

"Connection level" is an item for designating the network connection level required by program 14, 16 or 18 of the access point 6 or 12 to be connected. The parameters for "connection level" include "WAN" allowing connection to the Internet 2, "LAN" not allowing connection to the Internet 2, and "AUTO" that involves a connection test as to whether an already connected access point 6 or 12 can be connected to the Internet 2, and if connection to the Internet 2 is impossible, sets the connection level to the network connection level of already connected access point 6 or 12.

"Power save mode" is an item for designating whether or not the power of wireless firmware of connected access point 6 or 12 is to be saved. Parameters for "power save mode" include "ON" for saving the power of wireless firmware, and "OFF" for not saving the power of wireless firmware. The power of wireless firmware is saved only when the parameters included in the information of connection requests from all connected programs of the power save mode are "ON."

"Priority" is an item for designating priority of programs 14, 16 and 18 to be connected to access point 6 or 12. The priority is distinguished depending on whether it is a program running on the background of CPU 22 or running on the foreground of CPU 22. A program running on the foreground of CPU 22 is given higher priority over a program running on the background of CPU 22. Therefore, parameters for "priority" include "foreground" with higher priority and "background" of lower priority.

"Request source process type" is an item representing contents of a program for controlling activation in, for example, a network zone. Parameters for "request source process type" are names representing contents of the programs, such as "application," which is a game program executed by game machine 10, and "applet," which is a small program executed embedded in an application. "Request source process type" is not an indispensable item for the connection request from programs 14, 16 and 18.

"ESSID" is an item for designating ESSID of access point 6 or 12, to which connection is requested by the program. "AP number" is an item for designating the number of access point 6 or 12, to which connection is requested by the program, in the network zone.

Returning to FIG. 6, if it is determined that reception unit 20a does not yet received the connection request for connection to access point 6 or 12 from program 14, 16 or 18 (step S100: NO), connection control unit 20 returns the process to step S100.

If it is determined that reception unit 20a has received the connection request for connection to access point 6 or 12 from program 14, 16 or 18 (step S100: YES), connection control unit 20 determines whether or not connection has already been established between program 14, 16 or 18 and access point 6 or 12 (step S102).

If connection has been established between program 14, 16 or 18 and access point 6 or 12, information of connection status to access points 6 and 12 is saved in saving memory 27. Therefore, based on the information of connection status with access points 6 and 12, connection control unit 20 can determine whether or not connection has been established between program 14, 16 or 18 and access point 6 or 12.

[Information of Connection Status to Access Point]

Here, the information of connection status with access points 6 and 12 will be described.

FIG. 8 shows items included in the information of connection status to access points 6 and 12 and parameters for the items. The items included in the information of connection status to access points 6 and 12 include AP type, connection level, power save mode, priority, access limitation, ESSID and AP number.

"AP type" is an item indicating the type of access point 6 or 12 that is connected. Parameters for "AP type" include "network setting 1" representing a communication environment prepared at home or office, "network zone" designating a network zone as a communication environment provided by the manufacturer of the game machine, and "public wireless LAN" as a communication environment of wireless LAN open to the public.

"Connection level" is an item indicating the network connection level of access point 6 or 12 that is connected. Parameters for "connection level" include "WAN" allowing connection to the Internet 2, and "LAN" not allowing connection to the Internet 2.

"Power save mode" is an item indicating whether or not the power of wireless firmware of access point 6 or 12 that is connected is saved or not. Parameters for "power save mode" include "ON" indicating that the power of wireless firmware is saved, and "OFF" indicating that the power of wireless firmware is not saved.

"Priority" is an item indicating priority of programs 14, 16 and 18 connected to access point 6 or 12. The priority is distinguished depending on whether it is a program running on the background of CPU 22 or running on the foreground of CPU 22. A program running on the foreground of CPU 22 is given higher priority over a program running on the background of CPU 22. Therefore, parameters for "priority" include "foreground" with higher priority and "background" of lower priority.

"Access limitation" is an item indicating conditions under which access is limited, by access point 6 or 12 that is connected. Parameters for "access limitation" include, for example, "background inhibited" indicating that connection of a program running on the background of CPU 22 is inhibited, and "application S inhibited" indicating that connection of "application S," which is a program for making some transaction on the Internet 2, is inhibited.

"ESSID" is an item indicating ESSID of access point 6 or 12 that is connected. "AP number" is an item indicating the number of access point 6 or 12 that is connected, in the network zone.

Returning to FIG. 6, if it is determined by control unit 20 that program 14, 16 or 18 is not yet connected to access point 6 or 12 (step S102: NO), connection control unit 20 searches for an access point 6 or 12 of the type that satisfies the connection request from program 14, 16 or 18 (step S104). Specifically, if "AP type" included in the information of connection request from program 14, 16 or 18 is "network zone", connection control unit 20 searches for an access point 6 or 12 in the network zone, and if it is "ALL", it searches for an access point 6 or 12 in accordance with priority of search for access points 6 and 12.

Determination unit 20b of connection control unit 20 compares AP type included in the information of connection request received at reception unit 20a with the AP type included in the information of connection status to access point 6 or 12, and determines whether the access point having the AP type satisfying the connection request is the access point 6 or 12 (step S106).

If it is determined by determination unit 20b that the access point 6 or 12 is of the AP type satisfying the connection request (step S106: YES), connection control unit 20 performs a process for confirming connection level, such as a connection test of testing whether or not the connected access point 6 or 12 can be connected to the Internet 2, in accordance with the connection level included in the connection request, as will be described later (step S108).

After the process for confirming connection level at step S108, connection processing unit 20c of connection control unit 20 connects program 14, 16 or 18 to access point 6 or 12 (step S110). Further, connection processing unit 20c of connection control unit 20 saves AP type, connection level, priority and the like as the information of connection status to access point 6 or 12 in saving memory 27, based on the information of connection request from program 14, 16 or 18 connected to access point 6 or 12. When program 14, 16 or 18 is connected to access point 6 or 12, connection processing unit 20c gives program 14, 16 or 18 a notice of connection to access point 6 or 12.

Items necessary for the information of connection status to access point 6 or 12, such as access limitation and ESSID, are read from access point 6 or 12 connected at step S110 (step S112). Connection control unit 20 saves the read information as the information of connection status to access point 6 or 12 in saving memory 27.

Figure 9:
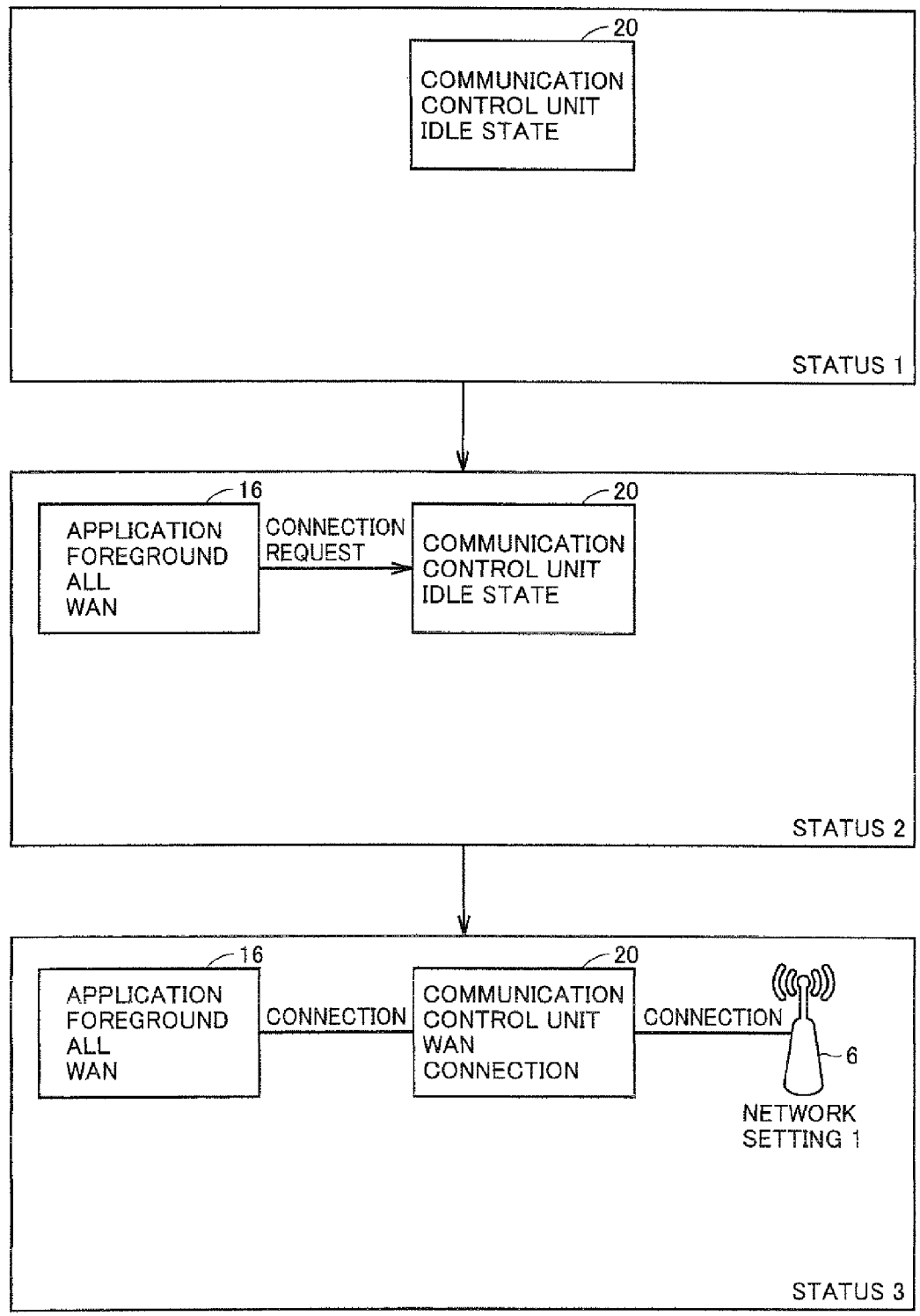
FIGS. 9 and 10 are schematic illustrations showing connection statuses between programs of the game machine in accordance with the embodiment of the present invention and the access point.

The process from step S100 to step S112 will be described with reference to a schematic illustration. FIG. 9 is a schematic illustration showing connection status between program 14, 16 or 18 of game machine 10 in accordance with the present embodiment and access point 6 or 12.

In Status 1 shown in FIG. 9, CPU 22 executes the connection control program to activate connection control unit 20, and connection control unit 20 is in the idle state here.

Next, in Status 2, program 16 is outputting a connection request to connection control unit 20 in the idle state. Program 16 is a program running on the foreground of CPU 22, and its process type is "application." Further, the information of connection request from program 16 includes the items AP type of "ALL", connection level of "WAN" and priority of "foreground."

Next, in Status 3, connection control unit 20 connects program 16 to access point 6 of which AP type is "network setting 1." Since AP type included in the information of connection request from program 16 is "ALL," connection control unit 20 searches for an access point 6 of which AP type is "network setting 1," in accordance with the priority of search for access points 6 and 12. Since the searched out access point 6 can be connected to the Internet 2, connection control unit 20 performs the process for confirming the connection level at step S108, and thereafter, connects program 16 to the access point 6. The state of connection control unit 20 changes from the idle state to WAN connection.

[e2. When Connection Between Program and Access Point Fails]

Returning to FIG. 6, if it is determined by determination unit 20b that it is not the access point 6 or 12 of the AP type satisfying the connection request (step S106: NO), connection control unit 20 gives a notice of "connection failure" information to program 14, 16 or 18 that has output the connection request, informing that the connection failed (step S107).

Figure 10:
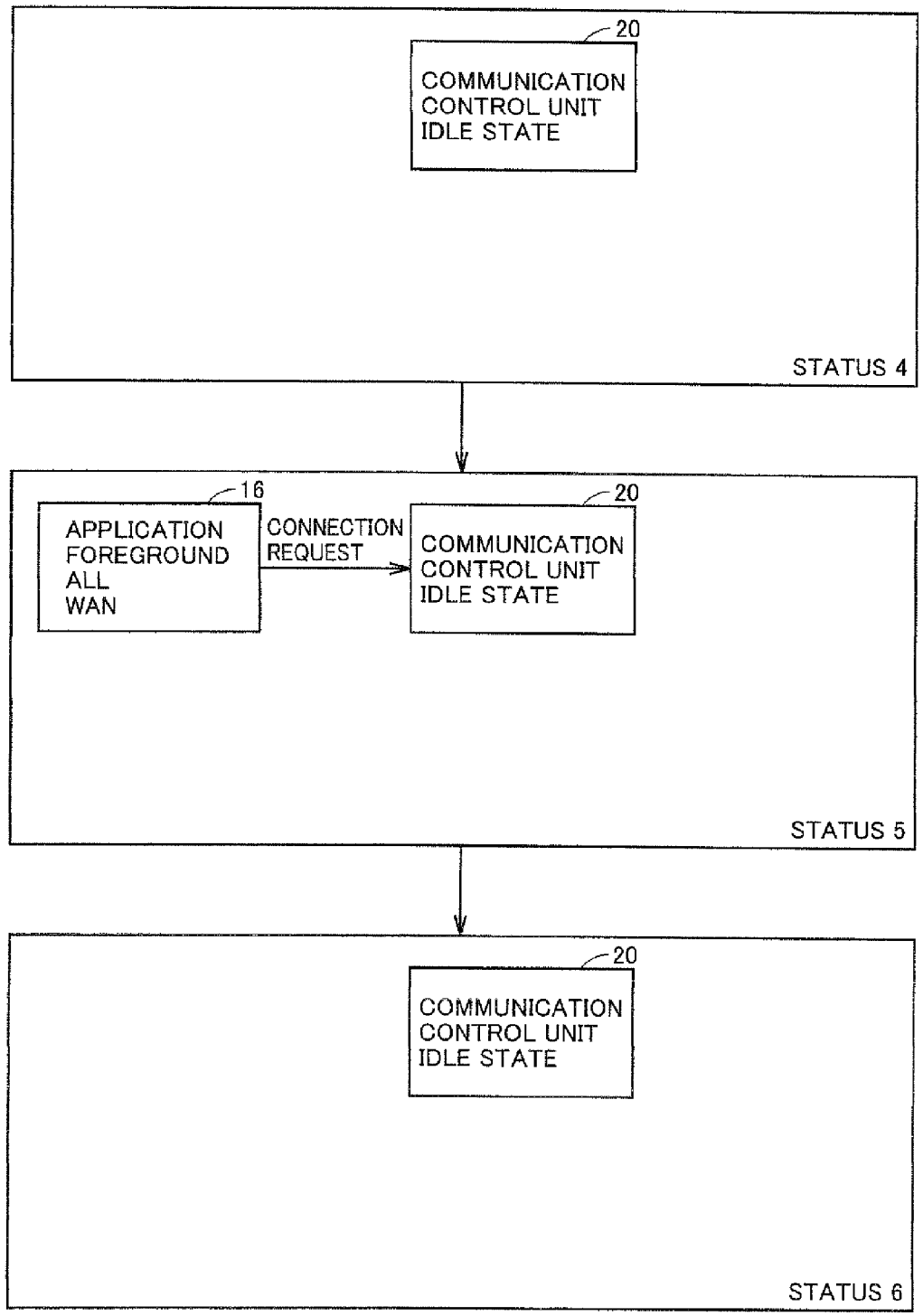

The process at steps S106 and 107 will be described with reference to a schematic illustration. FIG. 10 is a schematic illustration showing connection status between program 14, 16 or 18 of game machine 10 in accordance with the present embodiment and access point 6 or 12.

In Status 4 shown in FIG. 10, CPU 22 executes the connection control program to activate connection control unit 20, and connection control unit 20 is in the idle state here.

In Status 5, program 16 is outputting a connection request to connection control unit 20 in the idle state, Program 16 is a program running on the foreground of CPU 22, and its process type is "application." Further, the information of connection request from program 16 includes the items AP type of "ALL", connection level of "WAN" and priority of "foreground."

In Status 6, connection control unit 20 fails to find an access point 6 or 12 that satisfies the connection request from program 16, and determines not to connect program 16 to access point 6 or 12. If connection between program 16 and access point 6 or 12 fails, connection control unit 20 is kept in the idle state.

[e3. When Another Program is Already Connected to Access Point]

Returning to FIG. 6, before describing the process after step S112, a process if it is determined by connection control unit 20 that program 14, 16 or 18 has already been connected to access point 6 or 12 (step S120: YES) will be described.

Figure 11:
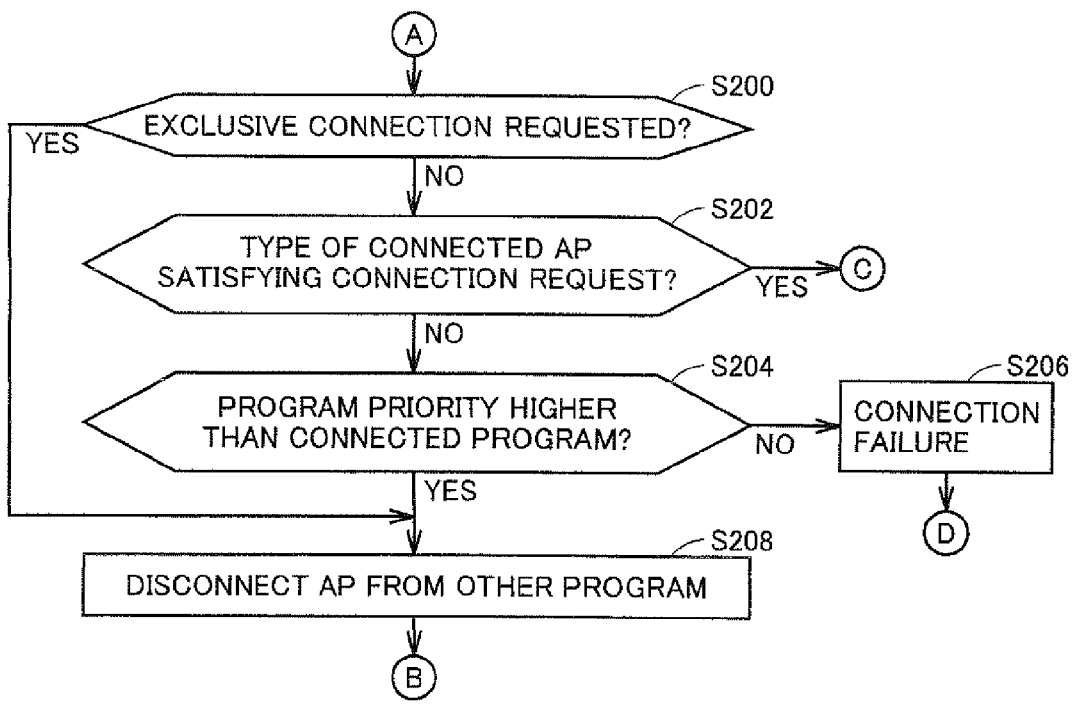
FIG. 11 is a flowchart when the connection control unit determines that connection between a program and an access point has already been established.

FIG. 11 is a flowchart when connection control unit 20 determines that connection between program 14, 16 or 18 and access point 6 or 12 has already been established.

First, if connection control unit 20 determines that connection between program 14, 16 or 18 and access point 6 or 12 has already been established (step S102.YES), determination unit 20b determines whether or not the connection request from program 14, 16 or 18 is an exclusive connection request (step S200). The determination as to whether it is an exclusive connection request is made based on the request source process type included in the information of connection request from program 14, 16 or 18, and if the request source process type is "Application B", it is determined to be the exclusive connection request.

If it is determined by determination unit 20b that the connection request from program 14, 16 or 18 is not the exclusive connection request (step S200: NO), determination unit 20b determines whether or not the AP type of access point 6 or 12 that has already been connected (connected) satisfies the connection request from program 14, 16 or 18 (step S202). Specifically, determination unit 20b compares the AP type included in the information of connection request received by reception unit 20a with the AP type included in the information of connection status to access point 6 or 12, and determines whether or not the AP type of already connected access point 6 or 12 satisfies the connection request from program 14, 16 or 18.

If it is determined by determination unit 20b that the AP type of connected access point 6 or 12 satisfies the connection request from program 14, 16 or 18 (step S202: YES), connection control unit 20 proceeds to the process of step S108 shown in FIG. 6.

Figure 12:
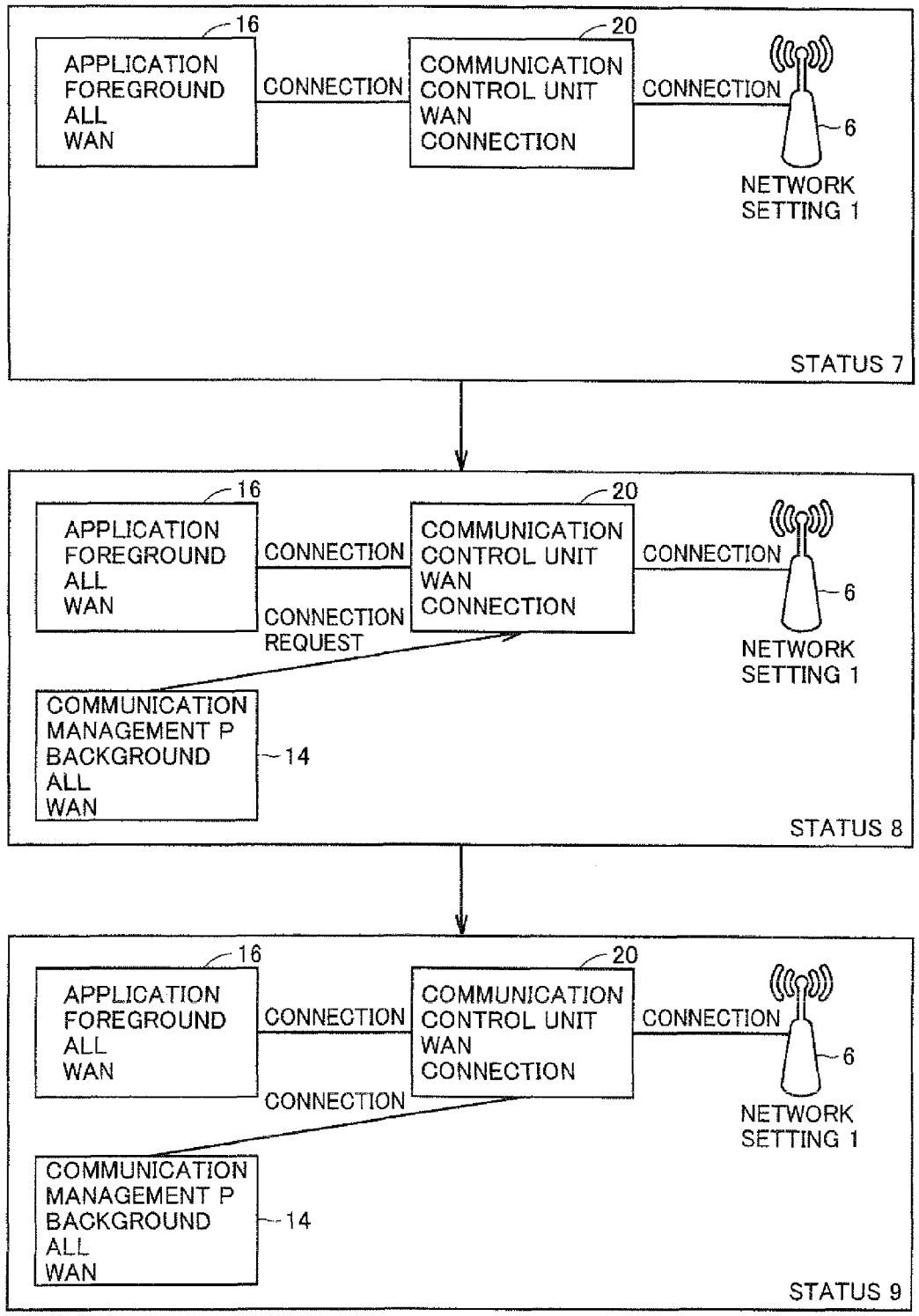
FIGS. 12 to 17 are schematic illustrations showing different statuses of connection between the program of the game machine in accordance with the embodiment of the present invention and the access point.

The process when determination unit 20b determines that the AP type of connected access point 6 or 12 satisfies the connection request from program 14, 16 or 18 at step S202 will be described with reference to a schematic illustration. FIG. 12 is a schematic illustration showing statuses of connection between program 14, 16 or 18 of game machine 10 in accordance with the present embodiment and access point 6 or 12.

In Status 7 shown in FIG. 12, program 16 is already connected to access point 6 having the AP type of "network setting 1." Program 16 is a program running on the foreground of CPU 22, and its process type is "application." Further, the information of connection request from program 16 includes the items AP type of "ALL", connection level of "WAN", and priority "foreground,"

Access point 6 satisfies the connection request from program 16, and its AP type is "network setting 1." Network setting 1 means that connection to the Internet 2 is possible and, therefore, the connection level is "WAN." Therefore, the state of connection control unit 20 is WAN connection.

Next, in Status 8, while program 16 is already connected to access point 6 of the AP type "network setting 1", program 14 outputs a connection request to connection control unit 20. Program 14 is a program running on the background of CPU 22, of which process type is "communication management program." Further, the information of connection request from program 14 includes the items AP type of "ALL", connection level of "WAN" and priority of "background."

Determination unit 20b of connection control unit 20 compares the AP type of "ALL" included in the information of connection request from program 14 with the AP type "network setting 1" of already connected access point 6, and determines that the AP type "network setting 1" of already connected access point 6 satisfies the AP type "ALL" included in the information of connection request from program 14.

Next, in Status 9, since the AP type "network setting 1" of already connected access point 6 is determined to satisfy the AP type "ALL" included in the information of connection request from program 14, program 14 is connected to access point 6 of which AP type is "network setting 1."

Specifically, connection control unit 20 connects programs 14 and 16 to access point 6 of which AP type is "network setting 1."

Returning to FIG. 11, if it is determined by determination unit 20b that the AP type of access point 6 or 12 that has already been connected (connected) does not satisfy the connection request from program 14, 16 or 18 (step S202: NO), determination unit 20b determines whether or not the priority of the program 14, 16 or 18 to be newly connected is higher than the already connected (connected) program 14, 16 or 18 (step S204). Specifically, determination unit 20b compares the priority included in the information of connection request received by reception unit 20a with the priority included in the information of connection status of access point 6 or 12.

If it is determined by determination unit 20b that the priority of the program 14, 16 or 18 to be newly connected is lower than the already connected (connected) program 14, 16 or 18 (step S204: NO), connection control unit 20 gives a notice of "connection failure" information to program 14, 16 or 18 that has output the connection request, informing that the connection failed (step S206). After step S206, connection control unit returns the process to step S100 shown in FIG. 6.

Figure 13:
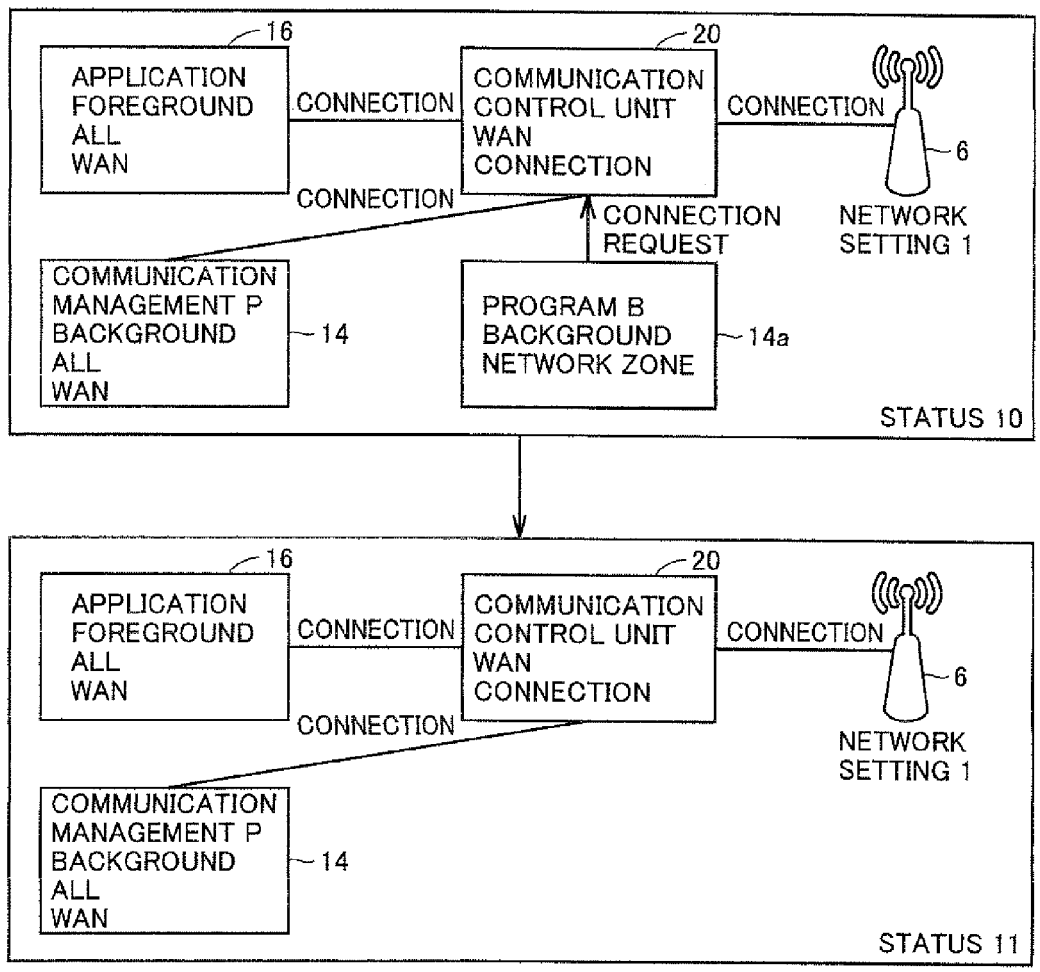

The process when determination unit 20b determines that the AP type of already connected access point 6 or 12 does not satisfy the connection request from program 14, 16 or 18 and that the priority of the program 14, 16 or 18 to be newly connected is lower than the already connected program 14, 16 or 18 at steps S202 and S204 will be described with reference to a schematic illustration. FIG. 13 is a schematic illustration showing statuses of connection between program 14, 16 or 18 of game machine 10 in accordance with the present embodiment and access point 6 or 12.

In status 10 shown in FIG. 13, while programs 14 and 16 are already connected to access point 6 of the AP type "network setting 1", a program 14a outputs' a connection request to connection control unit 20. Program 14 is a program running on the background of CPU 22, of which process type is "communication management program." Further, the information of connection request from program 14 includes the items AP type of "ALL", connection level of "WAN" and priority of "background."

Program 16 is a program running on the foreground of CPU 22, and its process type is "application." Further, the information of connection request from program 16 includes the items AP type of "ALL", connection level of "WAN" and priority of "foreground."

Access point 6 satisfies the connection request from programs 14 and 16, and its AP type is "network setting 1." Network setting 1 means that connection to the Internet 2 is possible and, therefore, the connection level is "WAN." Therefore, the state of connection control unit 20 is WAN connection.

Program 14a is a program running on the background of CPU 22, of which process type is "program B." Further, the information of connection request from program 14a includes the items AP type of "network zone", connection level of "WAN" and priority of "background." Program 14a is, for example, a program for obtaining specific character information from the network zone.

Determination unit 20b of connection control unit 20 compares the AP type "network zone" included in the information of connection request from program 14a with the AP type "network setting 1" of already connected access point 6, and determines that the AP type "network setting 1" of already connected access point 6 does not satisfy the AP type "network zone" included in the information of connection request from program 14a. Further, determination unit 20b compares the priority "background" included in the information of connection request from program 14a with the priority "foreground" of already connected program 16, and determines that the priority "background" included in the information of connection request from program 14a is lower than the priority "foreground" of already connected program 16.

Next, in Status 11, determination unit 20b of connection control unit 20 determines that the connection of program 14a to access point 6 is to be disconnected and, therefore, connection between program 14a and access point 6 fails, and the state in which programs 14 and 16 are connected to access point 6 is maintained.

Returning to FIG. 11, if it is determined by determination unit 20b that the priority of the program 14, 16 or 18 to be newly connected is higher than the already connected program 14, 16 or 18 (step S204: YES), connection control unit 20 disconnects connection of other programs to access point 6 or 12 (step S208). After step S208, connection control unit 20 returns the process to step S104 shown in FIG. 6, and connects the program 14, 16 or 18 to be newly connected to the newly searched out access point 6 or 12.

Figure 14:
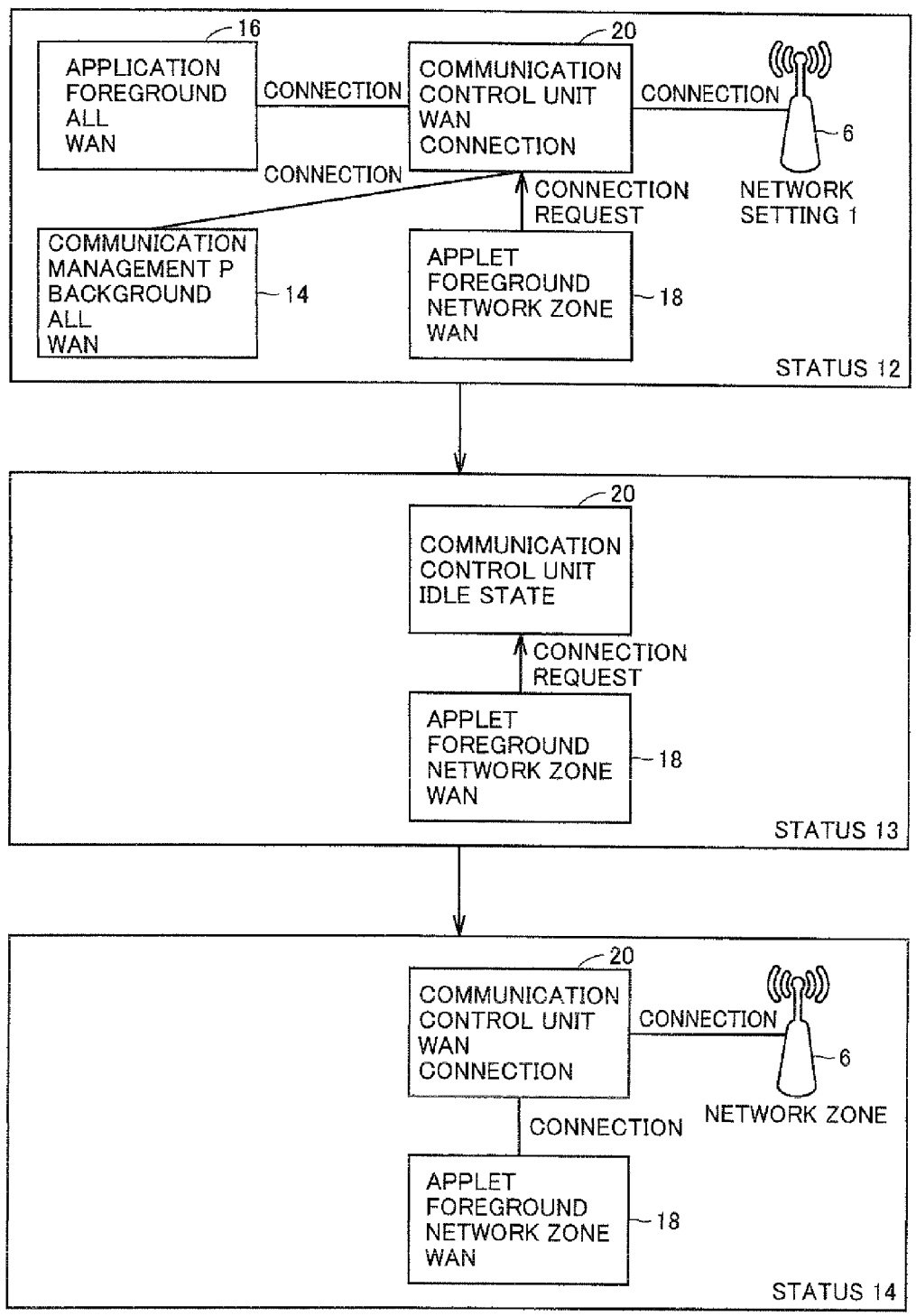

The process when it is determined by determination unit 20b that the priority of the program 14, 16 or 18 to be newly connected is higher than the already connected program 14, 16 or 18 will be described with reference to a schematic illustration. FIG. 14 is a schematic illustration showing statuses of connection between program 14, 16 or 18 of game machine 10 in accordance with the present embodiment and access point 6 or 12.

In Status 12 shown in FIG. 14, while programs 14 and 16 are already connected to access point 6 of the AP type "network setting 1", a program 18 outputs a connection request to connection control unit 20.

Program 14 is a program running on the background of CPU 22, of which process type is "communication management program." Further, the information of connection request from program 14 includes the items AP type of "ALL", connection level of "WAN" and priority of "background."

Program 16 is a program running on the foreground of CPU 22, and its process type is "application." Further, the information of connection request from program 16 includes the items AP type of "ALL", connection level of "WAN" and priority of "foreground."

Access point 6 satisfies the connection request from programs 14 and 16, and its AP type is "network setting 1." Network setting 1 means that connection to the Internet 2 is possible and, therefore, the connection level is "WAN." Therefore, the state of connection control unit 20 is WAN connection.

Program 18 is a program running on the foreground of CPU 22, and its process type is "applet." Further, the information of connection request from program 18 includes the items AP type of "network zone", connection level of "WAN" and priority of "foreground."

Determination unit 20b of connection control unit 20 compares the AP type "network zone" included in the information of connection request from program 18 with the AP type "network setting 1" of already connected access point 6, and determines that the AP type "network setting 1" of already connected access point 6 does not satisfy the AP type "network zone" included in the information of connection request from program 18. Further, determination unit 20b compares the priority "foreground" included in the information of connection request from program 18 with the priority "foreground" of already connected program 16. It is assumed that among the programs having the priority of "foreground," higher priority is given to the program that is connected to the access point 6 or 12 later. Therefore, determination unit 20b of connection control unit 20 determines that the priority "foreground" included in the information of connection request from program 18 is higher than the priority "foreground" of already connected program 16.

Next, in Status 13, since it is determined by determination unit 20b of connection control unit 20 that program 18 has higher priority and that program 18 is to be connected with priority to access point 6, connection of already connected access point 6 that does not satisfy the AP type "network zone" is disconnected. Specifically, connection processing unit 20c of connection control unit 20 disconnects the connection between programs 14 and 16 to access point 6. As a result, the state of connection control unit 20 changes from WAN connection to the idle state.

Next in Status 14, connection control unit 20 connects program 18 to access point 6 of which AP type is "network zone." Specifically, connection processing unit 20c of connection control unit 20 disconnects connection between programs 14 and 16 to access point 6, and thereafter, searches for an access point 6 having the AP type "network zone", since the AP type included in the information of connection request from program 18 is "network zone." Since the searched out access point 6 can be connected to the Internet 2, connection control unit 20 performs the process for confirming connection level of step S108 and, thereafter, connects program 18 to access point 6. The state of connection control unit 20 changes from the idle state to WAN connection.

Returning to FIG. 11, if it is determined by determination unit 20b that the connection request from programs 14, 16 or 18 is an exclusive connection request (step S200: YES), connection control unit 20 proceeds to the process of step S208. Specifically, if the connection request from program 14, 16 or 18 is an exclusive connection request, connection between any other program and access point 6 or 12 is disconnected, and only the program 14, 16 or 18 requesting exclusive connection is connected to access point 6.

Figure 15:
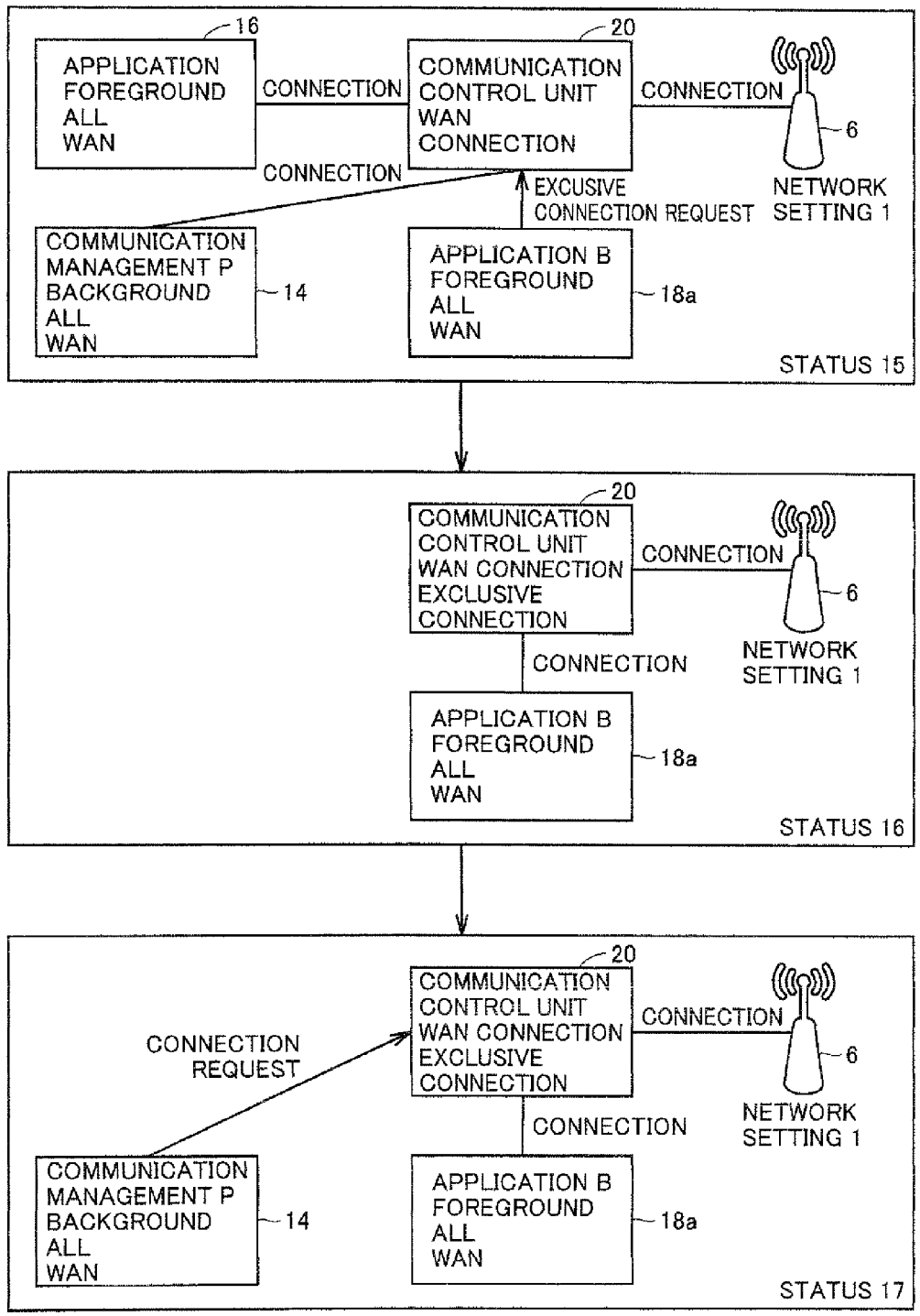

The process when it is determined by determination unit 20b that the connection request from program 14, 16 or 18 is an exclusive connection request at step S200 will be described with reference to a schematic illustration. FIG. 15 is a schematic illustration showing statuses of connection between program 14, 16 or 18 of game machine 10 in accordance with the present embodiment and access point 6 or 12.

In Status 15 shown in FIG. 15, while programs 14 and 16 are already connected to access point 6 of the AP type "network setting 1", a program 18a outputs an exclusive connection request to connection control unit 20.

Program 14 is a program running on the background of CPU 22, of which process type is "communication management program." Further, the information of connection request from program 14 includes the items AP type of "ALL", connection level of "WAN" and priority of "background."

Program 16 is a program running on the foreground of CPU 22, and its process type is "application." Further, the information of connection request from program 16 includes the items AP type of "ALL", connection level of "WAN" and priority of "foreground,"

Access point 6 satisfies the connection request from programs 14 and 16, and its AP type is "network setting 1." Network setting 1 means that connection to the Internet 2 is possible and, therefore, the connection level is "WAN." Therefore, the state of connection control unit 20 is WAN connection.

Program 18a is a program running on the foreground of CPU 22, and its process type is "application B." Further, the information of connection request from program 18a includes the items AP type of "ALL", connection level of "WAN" and priority of "foreground."

Since the process type included in the information of connection request from program 18a is "application B," determination unit 20b of connection control unit 20 determines that an exclusive connection request is output from program 18a. Based on the connection request from program 18a, connection processing unit 20c of connection control unit 20 disconnects connection between programs 14 and 16 to access point 6.

Next in Status 16, connection control unit 20 connects program 18*a* to an access point of which AP type is "network setting 1." Since the AP type included in the information of connection request from program 18*a* is "ALL," connection control unit 20 connects program 18*a* to the access point 6 of which AP type is "network setting 1" that has been connected to programs 14 and 16. When program 18*a* is connected to access point 6, the state of connection control unit 20 is changed to "exclusive connection" of WAN connection.

Next, in Status 18, program 14 outputs a connection request to connection control unit 20 in the "exclusive connection" state. Connection control unit 20 only connects program 18*a* and access point 6, and does not connect any other program to access point 6. Therefore, connection between program 14 and access point 6 fails, and connection control unit 20 gives a notice of "connection failure" information to program 14.

[e4. When Access to Access Point is Limited]

In the foregoing, connection control unit 20 making a determination as to whether program 14, 16 or 18 is to be connected to access point 6 or 12 depending on whether the AP type of already connected access point 6 or 12 satisfies the connection request from program 14, 16 or 18 has been described. The foregoing description, however, is not limiting, and connection control unit 20 may determine whether program 14, 16 or 18 is to be connected to access point 6 or 12 considering access limitation conditions of access points 6 and 12.

Figure 16:
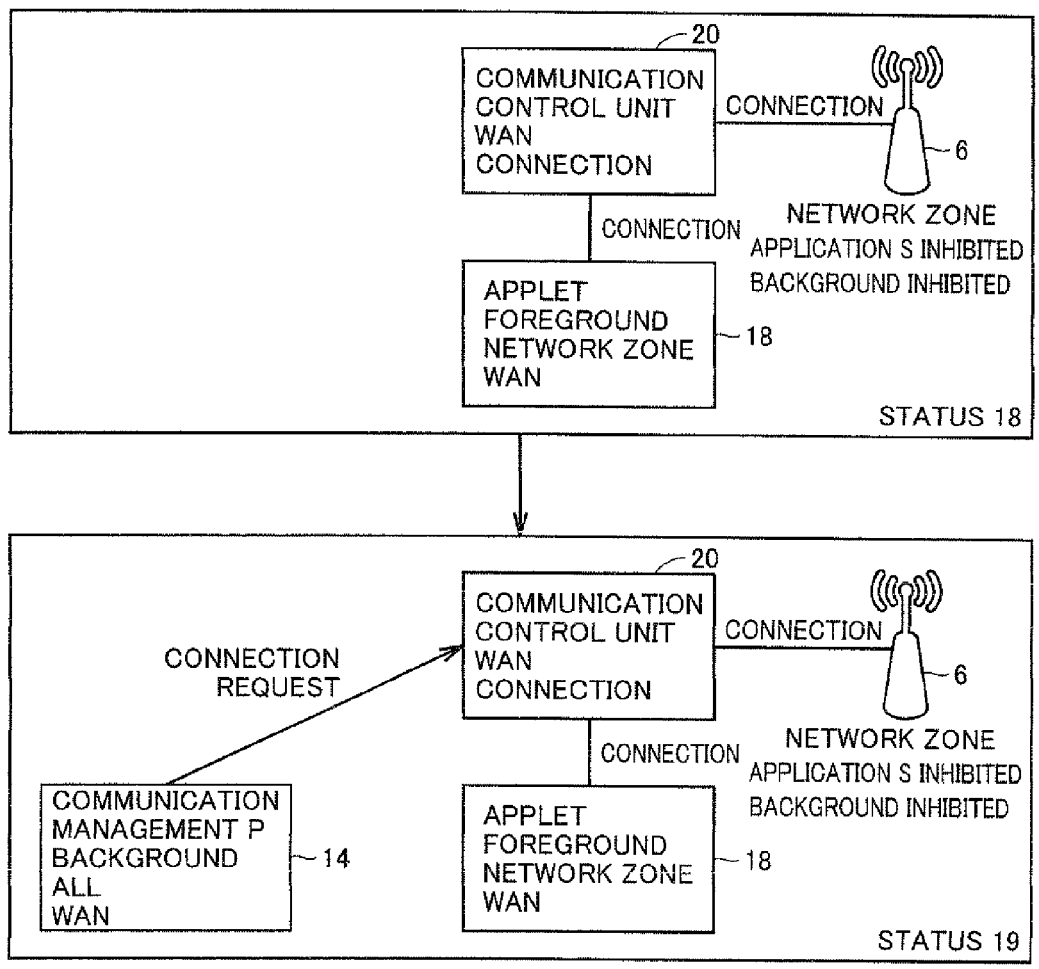
Figure 17:
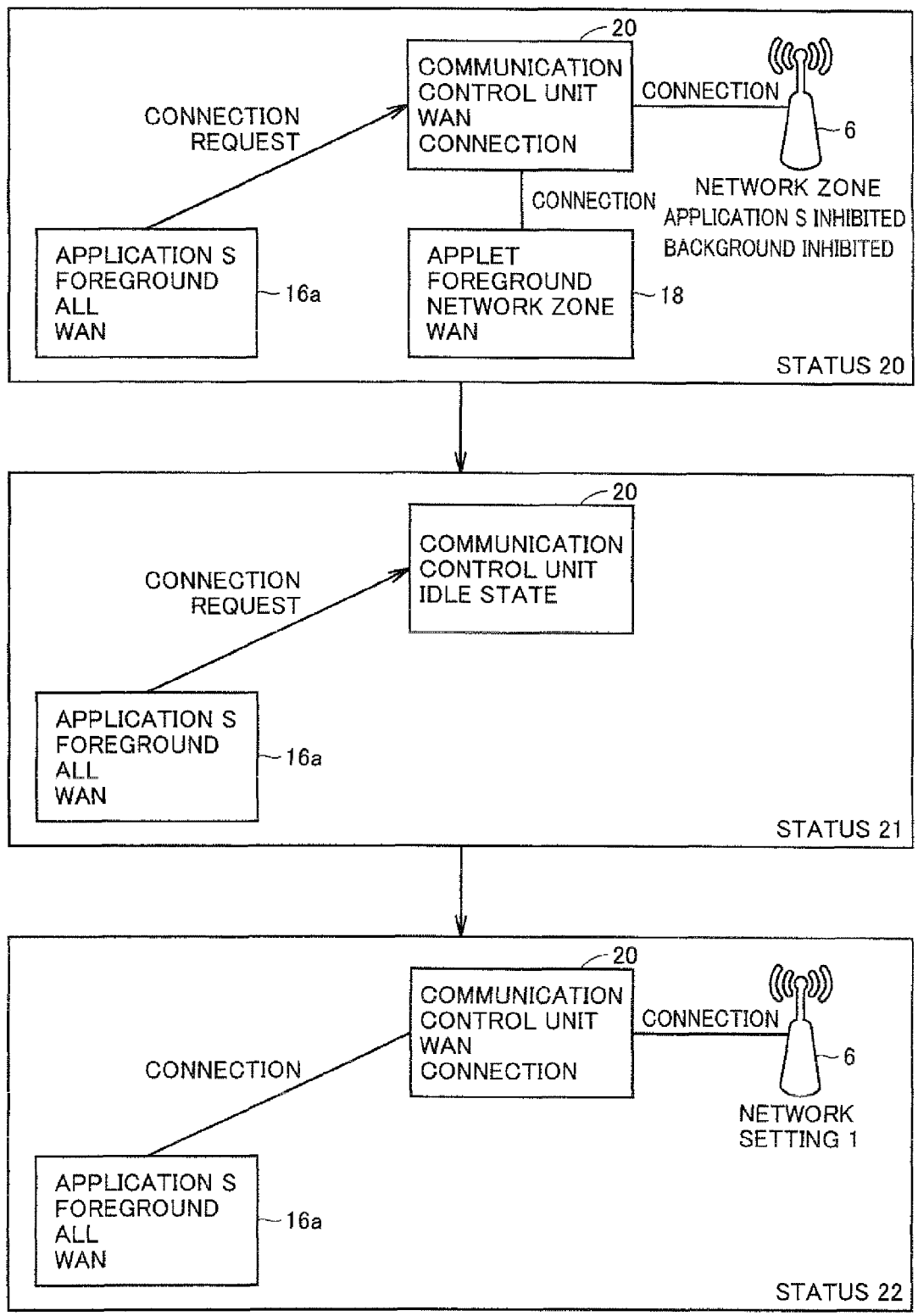

The process when connection control unit 20 determines whether program 14, 16 or 18 is to be connected to access point 6 or 12 considering the access limitation conditions will be described with reference to a schematic illustration. FIGS. 16 and 17 are schematic illustrations showing statuses of connection between program 14, 16 or 18 of game machine 10 in accordance with the present embodiment and access point 6 or 12.

In Status 18 shown in FIG. 16, program 18 is already connected to access point 6, of which AP type is "network zone."

Program 18 is a program running on the foreground of CPU 22, and its process type is "applet." Further, the information of connection request from program 18 includes the items AP type of "network zone", connection level of "WAN" and priority of "foreground."

Access point 6 satisfies the connection request from program 18, and its AP type is "network zone." However, access point 6 has "application S inhibited" and "background inhibited" as conditions for limiting access. After connection to access point 6 is established, connection control unit 20 reads conditions of access limitation from access point 6, as the information of access point 6 (step S112), and stores the information as the information of connection status to access point 6, in saving memory 27. The network zone allows connection to the Internet 2 and, therefore, the connection level becomes "WAN." Thus, the state of connection control unit 20 is "WAN connection."

Next, in Status 19, while program 18 is already connected to access point 6, program 14 outputs a connection request to connection control unit 20.

Program 14 is a program running on the background of CPU 22, of which process type is "communication management program." Further, the information of connection request from program 14 includes the items AP type of "ALL", connection level of "WAN" and priority of "background."

Therefore, determination unit 20*b* of connection control unit 20 inhibits connection of program 14 including the priority item of "background" in the information of connection request to access point 6, based on the access limitation item of "background inhibited" included in the information of connection status to access point 6.

In Status 20 shown in FIG. 17, while program 18 is already connected to access point 6 of which AP type is "network zone," a program 16*a* outputs a connection request to connection control unit 20.

Program 18 is a program running on the foreground of CPU 22, and its process type is "applet." Further, the information of connection request from program 18*a* includes the items AP type of "network zone", connection level of "WAN" and priority of "foreground."

Access point 6 satisfies the connection request from program 18 and its AP type is "network zone." Access point 6, however, has access limitation conditions of "application S inhibited" and "background inhibited." The network zone allows connection to the Internet 2 and, therefore, the connection level becomes "WAN." Thus, the state of connection control unit 20 is "WAN connection."

Program 16*a* is a program running on the foreground of CPU 22, and its process type is "application S." Further, the information of connection request from program 16*a* includes the items AP type of "ALL", connection level of "WAN" and priority of "foreground."

Therefore, determination unit 20*b* compares the priority "foreground" included in the information of connection request from program 16*a* with the priority "foreground" of already connected program 18, and determines that the priority "foreground" included in the information of connection request from program 16*a* is higher than the priority "foreground" of already connected program 18. Then, determination unit 20*b* of connection control unit 20 determines that, since the priority of program 16*a* is higher, program 16*a* is to be connected with priority to access point 6.

Next, in Status 21, since it is determined by determination unit 20*b* of connection control unit 20 that program 16*a* is to be connected to access point 6 with priority, connection between program 18 and access point 6 having the condition of "application S inhibited" is disconnected. Specifically, connection processing unit 20*c* of connection control unit 20 disconnects the connection between program 18 and access point 6 based on the connection request from program 16*a*. As a result, the state of connection control unit 20 is changed from WAN connection to the idle state.

Next, in Status 22, connection control unit 20 is connecting program 16*a* to access point 6 having AP type of "network setting 1" and not having any access inhibiting condition. Specifically, connection control unit 20 disconnects the connection between program 18 and access point 6 and, thereafter, searches for an access point not having the condition of "application S inhibited." Since the searched out access point 6 can be connected to the Internet 2, connection control unit 20 performs the process for confirming connection level of step S108 and, thereafter, connects program 16*a* to access point 6. The state of connection control unit 20 changes from the idle state to WAN connection.

[e5. Process for Confirming Connection Level]

Returning to FIG. 6, the process of step S108 at which connection control unit 20 performs the process for confirming connection level, including the connection test as to whether or not the connected access point 6 or 12 can be connected to the Internet 2, in accordance with the connection level included in the information of connection request, will be described.

Figure 18:
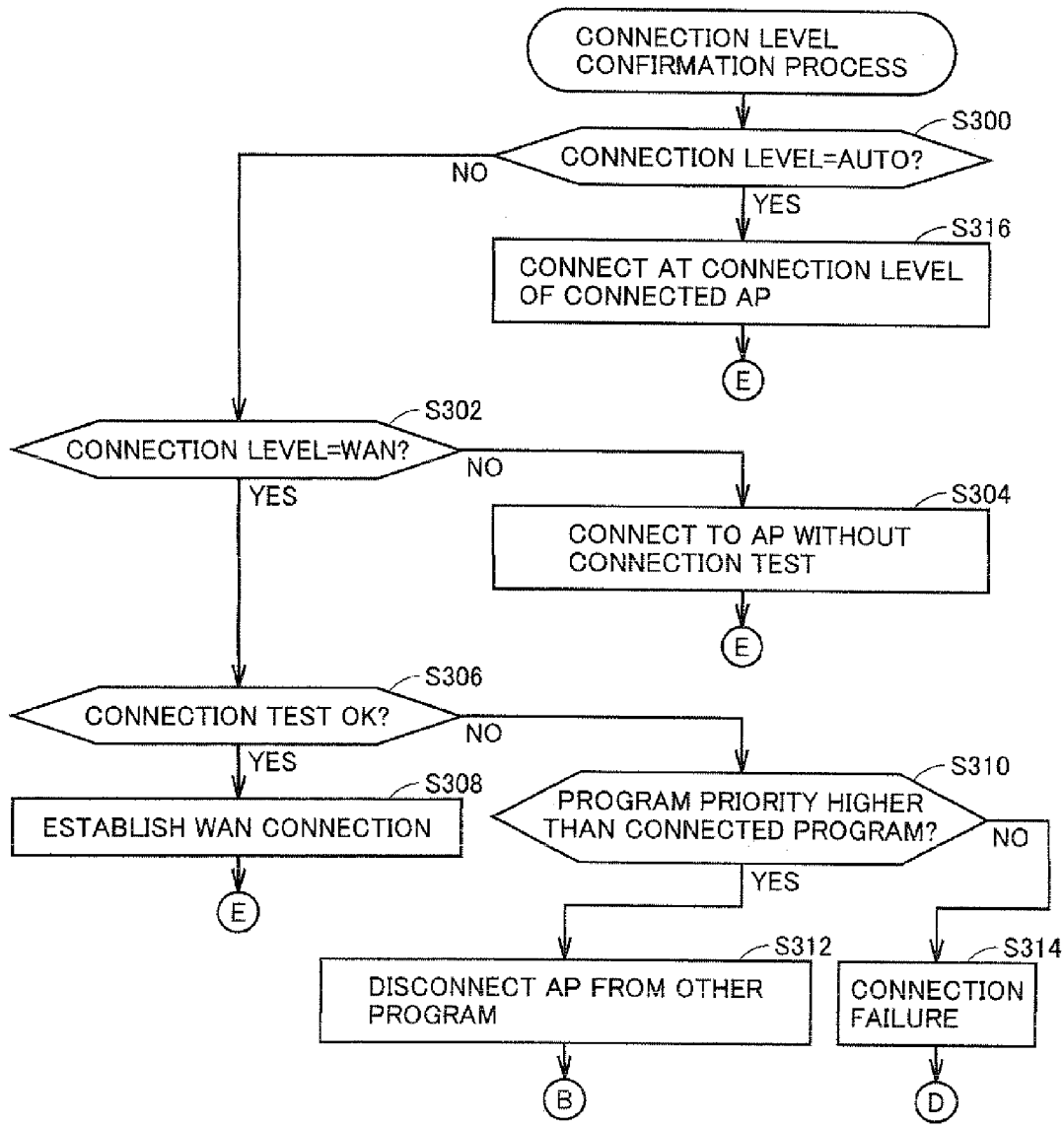
FIG. 18 is a flowchart representing the process of step S108.

FIG. 18 is a flowchart representing the process of step S108.

First, connection control unit 20 determines whether or not the connection level included in the information of connection request is "AUTO" (step S300).

Next, if it is determined by connection control unit 20 that the connection level included in the information of connection request is not "AUTO" (step S300: NO), connection control unit 20 determines whether or not the connection level included in the information of connection request is "WAN" (step S302).

Then, if it is determined by connection control unit 20 that the connection level included in the information of connection request is not "WAN" (step S302: NO), connection control unit 20 connects program 14, 16 or 18 to access point 6 or 12 without performing the connection test as to whether connection to the Internet 2 is possible (step S304). Specifically, since it is possible to determine the connection level included in the information of connection request from program 14, 16 or 18 to be "LAN," it is unnecessary that access point 6 or 12 is connected to the Internet 2. Therefore, regardless of whether or not access point 6 or 12 is connected to the Internet 2, program 14, 16 or 18 may be connected to access point 6 or 12. After step S304, connection control unit returns the process to step S112 shown in FIG. 6.

Figure 19:
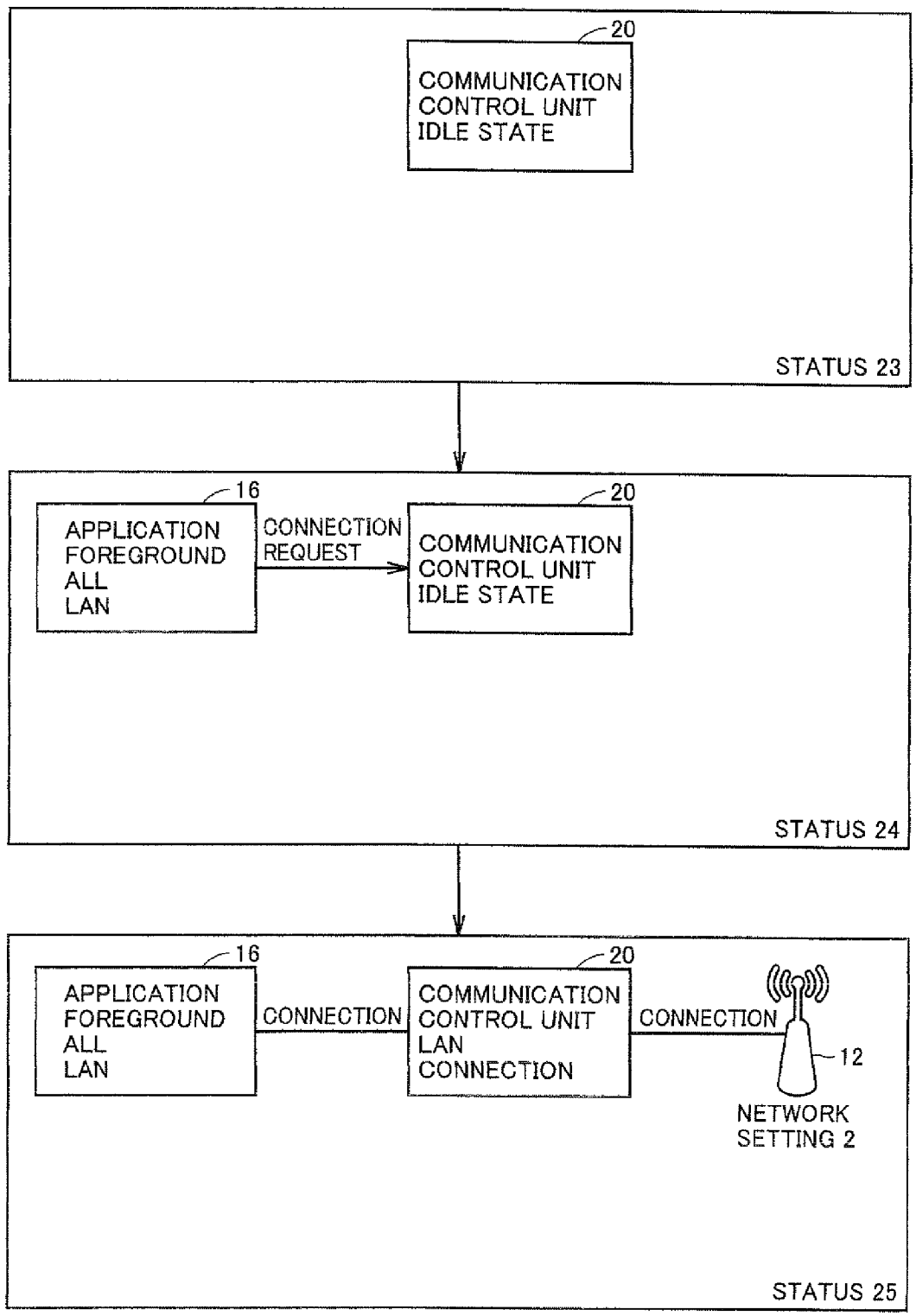
FIGS. 19 to 23 are schematic illustrations showing further different statuses of connection between the game machine in accordance with the embodiment of the present invention and the access point.

The process for connecting program 14, 16 or 18 to access point 6 or 12 without performing the connection test as to whether connection to the Internet 2 is possible at step S304 will be described with reference to a schematic illustration. FIG. 19 is a schematic illustration showing statuses of connection between program 14, 16 or 18 of game machine 10 in accordance with the present embodiment and access point 6 or 12.

In Status 23 shown in FIG. 19, CPU 22 executes the connection control program to activate connection control unit 20, and connection control unit 20 is in the idle state.

In status 24, program 16 outputs a connection request to connection control unit 20 in the idle state. Program 16 is a program running on the foreground of CPU 22, and its process type is "application." Further, the information of connection request from program 16 includes the items AP type of "ALL", connection level of "LAN" and priority of "foreground."

Next, in Status 25, connection control unit 20 connects program 16 to access point 12 of which AP type is "network setting 2." The searched out access point 12 of which AP type is "network setting 2" cannot be connected to the Internet 2. Since the connection level included in the information of connection request from program 16 is "LAN," connection control unit 20 connects program 16 to access point 12 without performing the connection test. Therefore, the state of connection control unit changes from the idle state to LAN connection.

Returning to FIG. 18, if it is determined by connection control unit 20 that the connection level included in the information of connection request is "WAN" (step S302: YES), connection control unit 20 performs the connection test as to whether connection to the Internet 2 is possible, and determines whether the connection test is successful (OK) (step S306).

Next, if it is determined by connection control unit 20 that the connection test was successful (step S306: YES), connection control unit 20 connects program 14, 16 or 18 to access point 6 as a point allowing connection to the Internet 2 (step S308). Specifically, at step S308, connection control unit 20 connects program 14, 16 or 18 to access point 6 through WAN. After step S308, connection control unit 20 returns the process to step S112 shown in FIG. 6.

Figure 20:
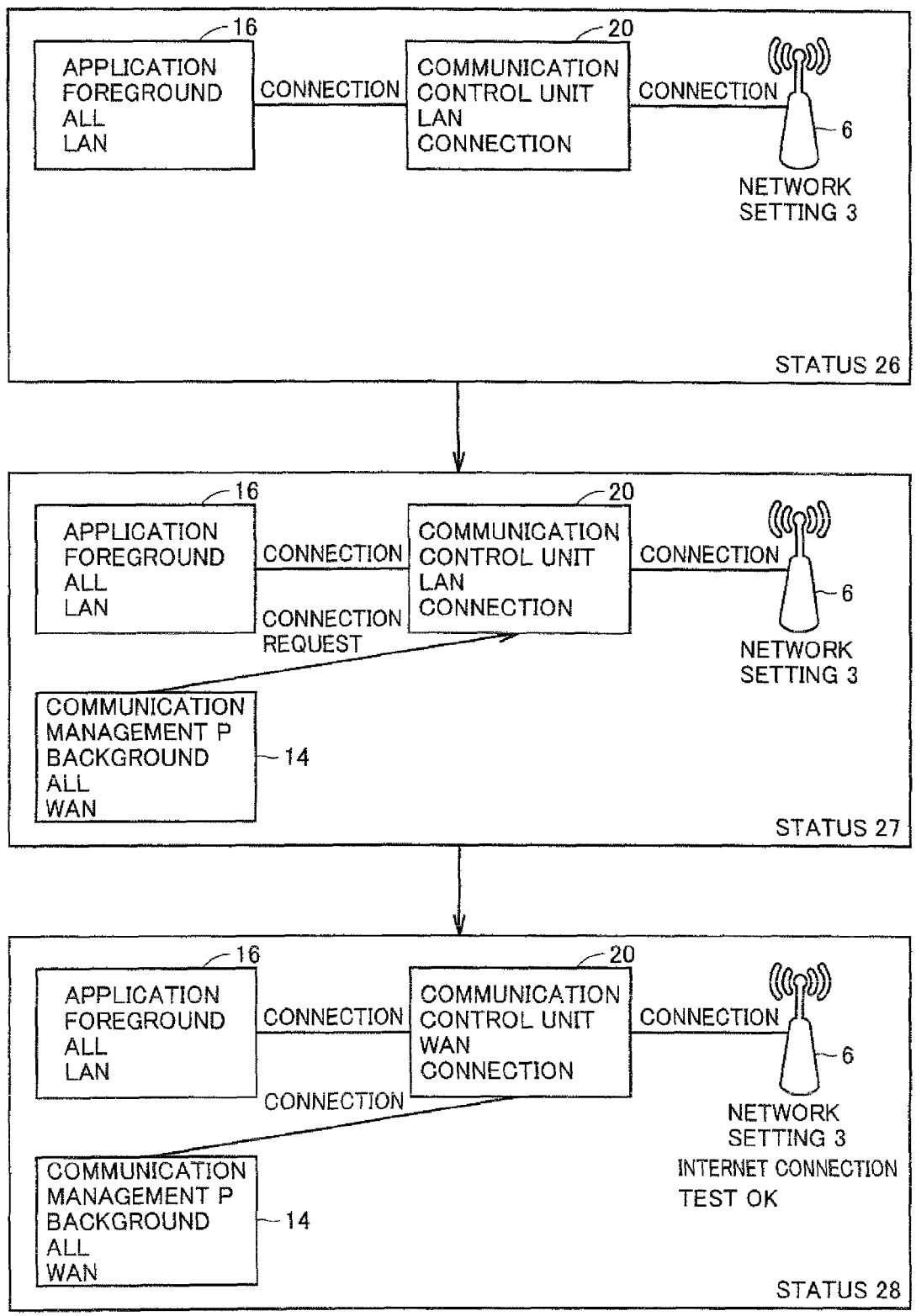

The process for connecting program 14, 16 or 18 to access point 6 as a point allowing connection to the Internet 2 after successful connection test at steps S306 and S308 will be described with reference to a schematic illustration. FIG. 20 is a schematic illustration showing statuses of connection between program 14, 16 or 18 of game machine 10 in accordance with the present embodiment and access point 6 or 12.

In Status 26 shown in FIG. 20, program 16 is connected to access point 6 of which AP type is "network setting 3."

Program 16 is a program running on the foreground of CPU 22, and its process type is "application." Further, the information of connection request from program 16 includes the items AP type of "ALL", connection level of "LAN" and priority of "foreground." Since the connection level is "LAN," connection control unit 20 connects program 16 to access point 6 through LAN, without performing the connection test of access point 6.

Access point 6 satisfies the connection request from program 16, and its AP type is "network setting 3." Though network setting 3 allows connection to the Internet 2, since the connection level included in the information of connection request from program 16 is "LAN," connection test was not performed at the time when program 16 was connected. Therefore, the state of connection control unit 20 is LAN connection.

Next, in Status 27, while program 16 is already connected to access point 6 of the AP type "network setting 3", program 14 outputs a connection request to connection control unit 20.

Program 14 is a program running on the background of CPU 22, of which process type is "communication management program." Further, the information of connection request from program 14 includes the items AP type of "ALL", connection level of "WAN" and priority of "background."

Since the connection level included in the information of connection request from program 14 is "WAN," determination unit 20*b* of connection control unit 20 performs the connection test of access point 6.

Next, in Status 28, since the connection test performed on access point 6 has been successful, connection control unit 20 changes the connection with access point 6 from LAN connection to WAN connection. Specifically, connection control unit 20 connects programs 14 and 16 to access point 6 through WAN.

Returning to FIG. 18, if it is determined by connection control unit 20 that the connection test failed (step S306: NO), determination unit 20*b* determines whether or not the priority of program 14, 16 or 18 to be newly connected is higher than the priority of already connected (connected) program 14, 16 or 18 (step S310).

If it is determined by determination unit 20*b* that the priority of the program 14, 16 or 18 to be newly connected is lower than the already connected (connected) program 14, 16 or 18 (step S310: NO), connection control unit 20 gives a notice of "connection failure" information to program 14, 16 or 18 that has output the connection request, informing that the connection failed (step S314). After step S314, connection control unit 20 returns the process to step S100 of FIG. 6.

If it is determined by determination unit 20*b* that the priority of the program 14, 16 or 18 to be newly connected is higher than the already connected (connected) program 14, 16 or 18 (step S310: YES), connection control unit 20 disconnects the connection between any other program and access point 6 or 12 (step S312). After step S312, connection control unit 20 returns the process to step S104 shown in FIG. 6, and connects the program 14, 16 or 18 to be newly connected to newly found access point 6 or 12.

Returning to FIG. 18, if it is determined by connection control unit 20 that the connection level included in the information of connection request is "AUTO" (step S300: YES), connection control unit 20 connects program 14, 16 or 18 to access point 6 or 12 at the connection level of already connected access point 6 or 12 (step S316). After step S316, connection control unit 20 returns the process to step S112 shown in FIG. 6.

If the connection level included in the information of connection request from program 14, 16 or 18 is "AUTO," connection control unit 20 performs the connection test on access point 6 having the connection level "WAN," and connects program 14, 16 or 18 to access point 6 through WAN. On the other hand, connection control unit 20 connects program 14, 16 or 18 to access point 12 through LAN, without performing the connection test on access point 12 of which connection level is "LAN."

Figure 21:
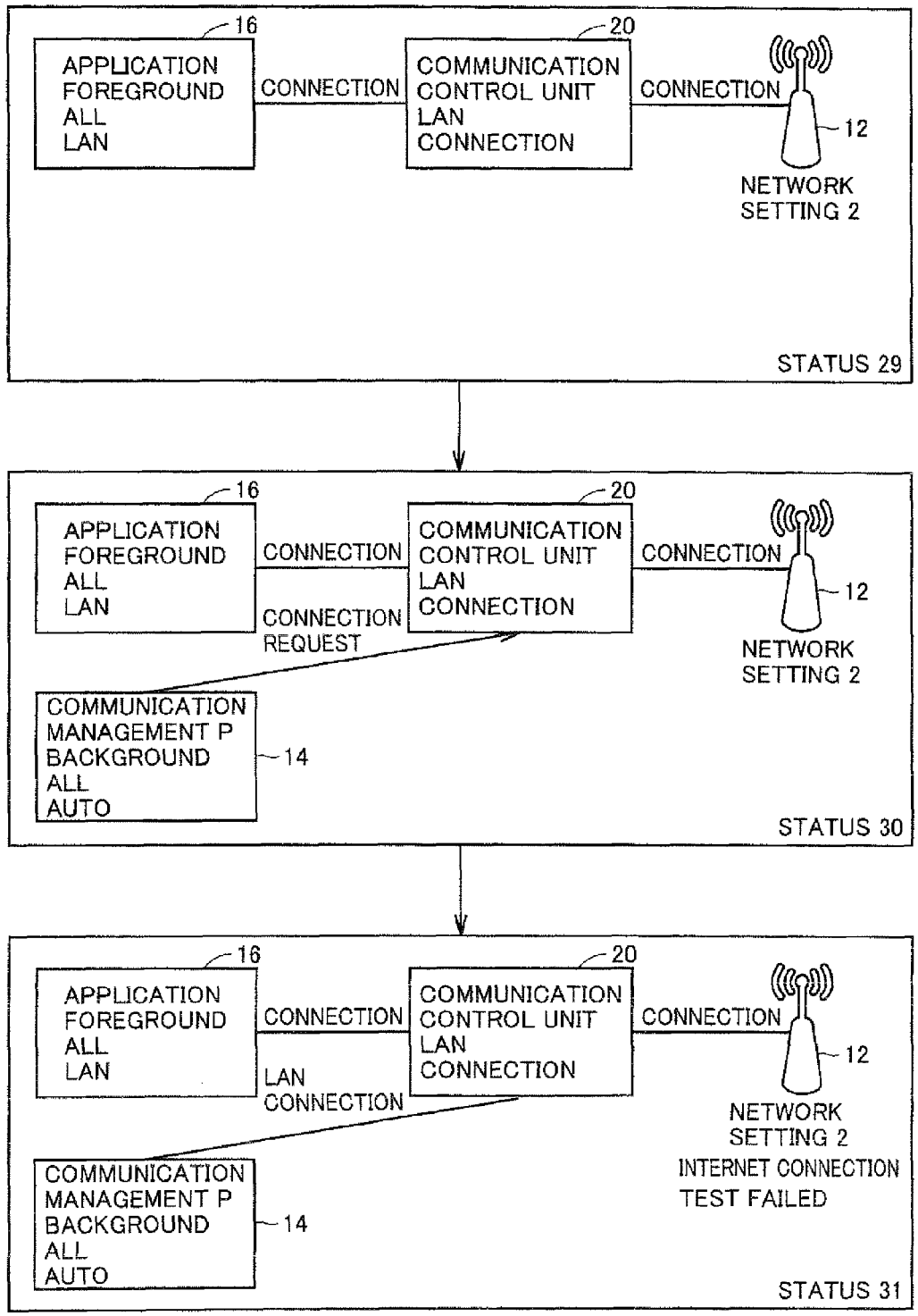

The process when connection control unit 20 determines that the connection level included in the information of connection request is "AUTO" and connects program 14, 16 or 18 to access point 6 or 12 at the connection level of already connected access point 6 or 12 at steps S300 and S316 will be described with reference to a schematic illustration. FIG. 21 is a schematic illustration showing statuses of connection between program 14, 16 or 18 of game machine 10 in accordance with the present embodiment and access point 6 or 12.

In Status 29 shown in FIG. 21, program 16 is connected to access point 12 of which AP type is "network setting 2."

Program 16 is a program running on the foreground of CPU 22, and its process type is "application." Further, the information of connection request from program 16 includes the items AP type of "ALL", connection level of "LAN" and priority of "foreground." Since the connection level is "LAN," connection control unit 20 connects program 16 to access point 6 through LAN, without performing the connection test of access point 6.

Access point 12 satisfies the connection request from program 16, and its AP type is "network setting 2" and its connection level is "LAN." Network setting 2 does not allow connection to the Internet 2. Further, since the connection level included in the information of connection request from program 16 is "LAN," connection test was not performed at the time when program 16 was connected. Therefore, the state of connection control unit 20 is LAN connection.

Next, in Status 30, while program 16 has already been connected to access point 6, program 14 outputs a connection request to connection control unit 20.

Program 14 is a program running on the background of CPU 22, of which process type is "communication management program." Further, the information of connection request from program 14 includes the items AP type of "ALL", connection level of "AUTO" and priority of "background."

Since the connection level included in the information of connection request from program 14 is "AUTO," determination unit 20b of connection control unit 20 first performs the connection test on access point 12.

Thereafter, in Status 31, since the connection test performed on access point 12 failed, connection control unit 20 connects program 14 to access point 12 through LAN.

[e6. When Connection to Access Point is to be Disconnected]

Returning to FIG. 6, after step S112, reception unit 20a of connection control unit 20 determines whether or not a disconnection request has been made for disconnecting connection to access point 6 or 12 from all programs 14, 16 and 18 (step S114).

If it is determined by reception unit 20a that the disconnection request has been made for disconnecting connection to access point 6 or 12 from all programs 14, 16 and 18 (step S114: YES), connection processing unit 20c of connection control unit 20 disconnects the connection of all programs 14, 16 and 18 to access point 6 or 12 (step S118).

Figure 22:
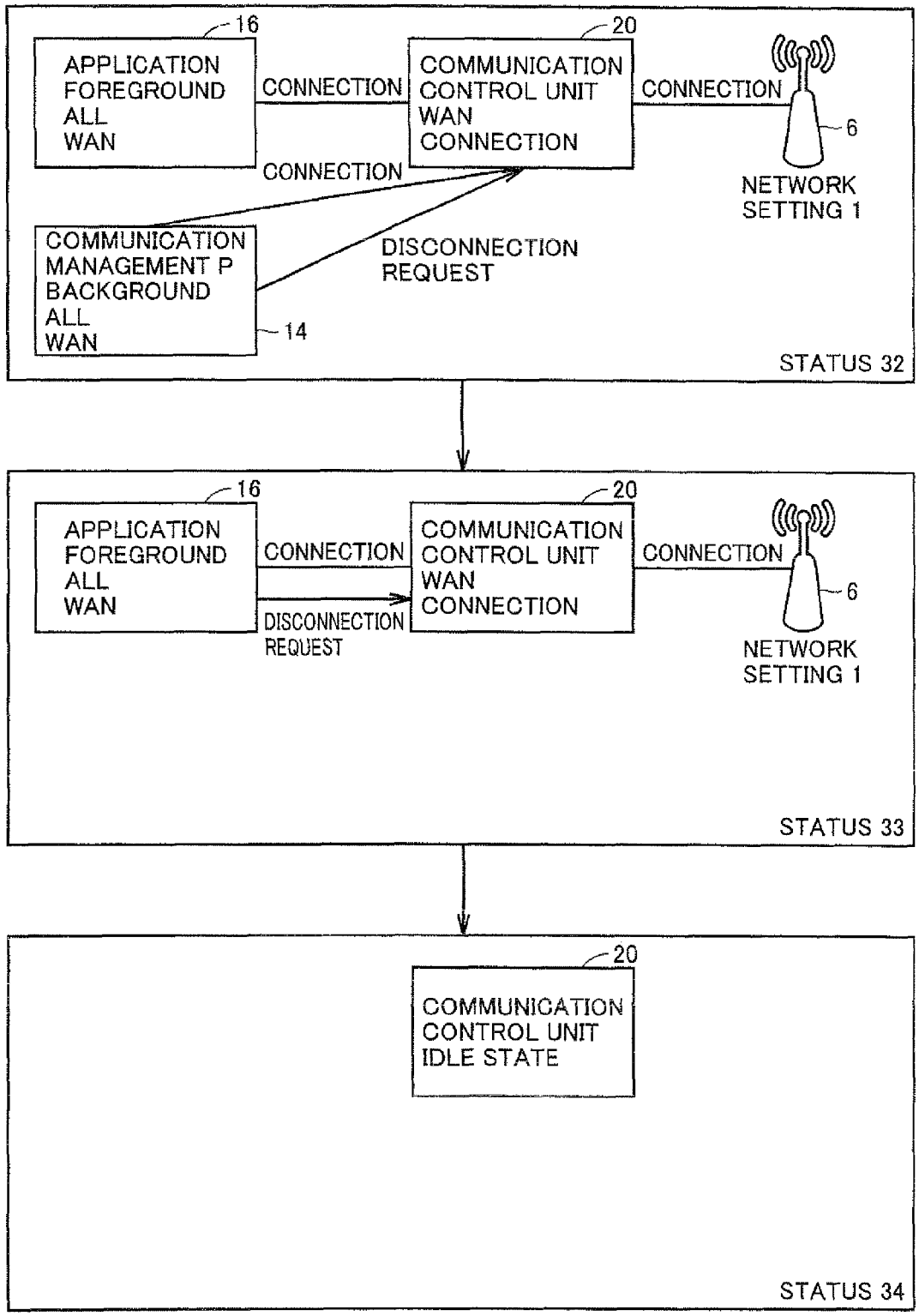

The process when disconnection request for disconnecting connection to access point 6 or 12 is made from all programs 14, 16 and 18 and connection control unit 20 disconnects connections between all programs 14, 16 and 18 to access point 6 or 12 at steps S114 and S118 will be described with reference to a schematic illustration. FIG. 22 is a schematic illustration showing statuses of connection between program 14, 16 or 18 of game machine 10 in accordance with the present embodiment and access point 6 or 12.

In Status 32 shown in FIG. 22, while programs 14 and 16 are already connected to access point 6 of which AP type is "network setting 1," a disconnection request for disconnecting the connection to access point 6 is output from program 14. Based on the disconnection request, connection processing unit 20c of connection control unit 20 disconnects the connection between program 14 and access point 6.

Program 14 is a program running on the background of CPU 22, of which process type is "communication management program." Further, the information of connection request from program 14 includes the items AP type of "ALL", connection level of "WAN" and priority of "background."

Program 16 is a program running on the foreground of CPU 22, and its process type is "application." Further, the information of connection request from program 16 includes the items AP type of "ALL", connection level of "WAN" and priority of "foreground."

Access point 6 satisfies the connection requests from programs 14 and 16, and its AP type is "network setting 1." Network setting 1 means that connection to the Internet 2 is possible and, therefore, the connection level is "WAN." Therefore, the state of connection control unit 20 is WAN connection.

In Status 33, while program 16 is connected to access point 6, a disconnection request for disconnecting the connection to access point 6 is output from program 16. Based on the disconnection request, connection processing unit 20c of connection control unit 20 disconnects the connection between program 14 and access point 6.

In Status 34, since disconnection requests for disconnecting the connections to access point 6 have been made from all programs 14 and 16, connection control unit 20 disconnects the connections to access point 6. The state of connection control unit 20 changes from WAN connection to the idle state.

Returning to FIG. 6, if it is determined by reception unit 20a that the disconnection request for disconnecting connection to access point 6 or 12 is not made from all programs 14, 16 and 18 (step S114: NO), connection control unit 20 determines whether or not the connection to access point 6 or 12 has been lost (step S116). Even if there is not a disconnection request from program 14, 16 or 18 for disconnecting the connection to access point 6 or 12, connection between program 14, 16 or 18 to access point 6 or 12 may be disrupted if communication state to access point 6 or 12 becomes poorer.

Specifically, if it is determined by connection control unit 20 that connection to access point 6 or 12 is lost (step S116: YES), connection processing unit 20c of connection control unit 20 disconnects connections of all programs 14, 16 and 18 to access point 6 or 12 (step S118).

Figure 23:
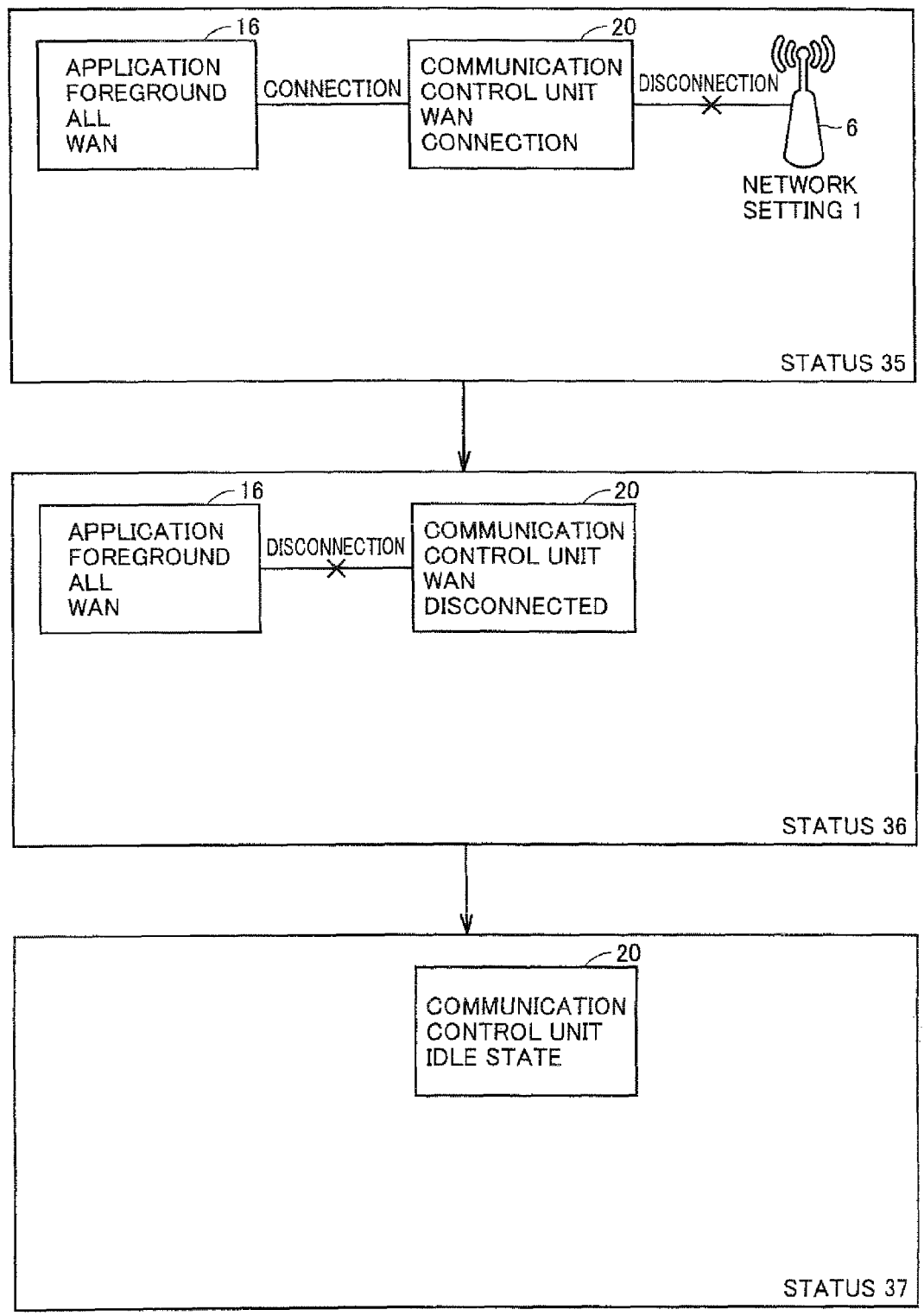

The process when connection to access point 6 or 12 is lost and connection control unit 20 disconnects connections of all programs 14, 16 and 18 to access point 6 or 12 at steps S116 and S118 will be described with reference to a schematic illustration. FIG. 23 is a schematic illustration showing statuses of connection between program 14, 16 or 18 of game machine 10 in accordance with the present embodiment and access point 6 or 12.

In Status 35 shown in FIG. 23, while program 16 has been connected to access point 6 of which AP type is "network setting 1," communication state with access point 6 becomes poorer and the connection between connection control unit 20 and access point 6 is lost.

Program 16 is a program running on the foreground of CPU 22, and its process type is "application." Further, the information of connection request from program 16 includes the items AP type of "ALL", connection level of "WAN" and priority of "foreground."

Access point 6 satisfies the connection request from program 16, and its AP type is "network setting 1" Network setting 1 means that connection to the Internet 2 is possible and, therefore, the connection level is "WAN." Therefore, the state of connection control unit 20 is WAN connection.

In Status 36, since connection to access point 6 is lost, connection control unit 20 disconnects the connection to program 16. Therefore, the state of connection control unit 20 is WAN disconnection.

In Status 37, since connection control unit 20 disconnected connections of all programs to access point 6, the state of connection control unit 20 is changed to the idle state.

Returning to FIG. 6, if it is deter mined by connection control unit 20 that the connection to access point 6 or 12 is not lost (step S116: NO), connection control unit 20 returns the process to step S114.

Next, connection control unit 20 determines whether the power of game machine 10 is turned OFF or set to the sleep state (step S120). If it is determined by connection control unit 20 that the power of game machine 10 is turned OFF or the machine entered the sleep state (step S120: YES), CPU 22 ends the connection control process, and stops connection control unit 20.

If it is determined by connection control unit 20 that the power of game machine 10 is not OFF or it is not in the sleep state (step S120: NO), connection control unit 20 returns the process to step S100.

[e7. State Transition of Connection Control Unit 20]

Figure 24:
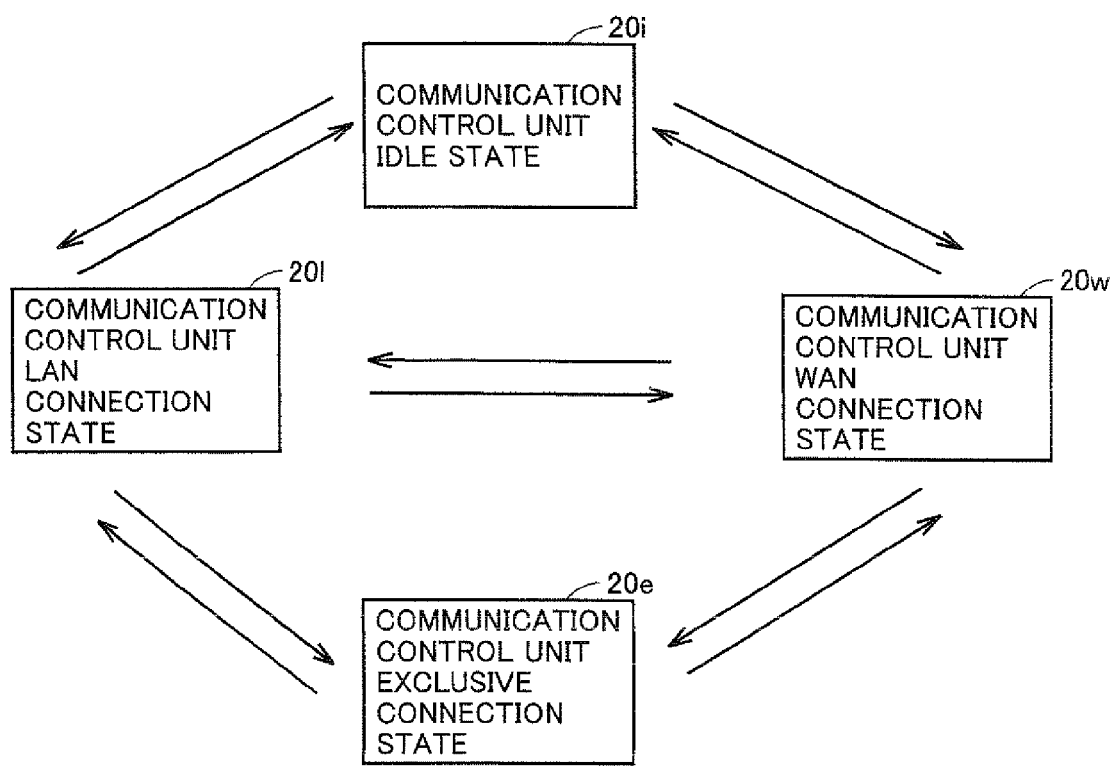
FIG. 24 is a schematic illustration showing state transition of connection control unit of the game machine in accordance with the embodiment of the present invention.

FIG. 24 is a schematic illustration showing state transition of connection control unit 20 of game machine 10 in accordance with the present embodiment. When activated, connection control unit 20 enters the idle state 20*i*, not connected to access point 6 or 12. Then, receiving a connection request having the connection level of "LAN" from program 14, 16 or 18, connection control unit 20 establishes connection to access point 6 or 12 of which connection level is "LAN," and enters LAN connected state 201. Receiving a connection request having the connection level of "WAN" from program 14, 16 or 18, connection control unit 20 establishes connection to access point 6 or 12 of which connection level is "WAN," and enters WAN connected state 20*w*. When connection between program 14, 16 or 18 to access point 6 or 12 is lost, connection control unit 20 returns to the idle state 20*i*.

Further, receiving an exclusive connection request from program 14, 16 or 18, connection control unit 20 enters the exclusive connection state 20*e*, in which exclusive connection is established with access point 6 or 12 of which connection level is "LAN" or "WAN." Further, while connection control unit 20 is in the LAN connection state 201 with connection established with access point 6 or 12 having connection level of "LAN", if the connection test succeeds, the state changes to the WAN connection state 20*w* with connection established with access point 6 or 12 having connection level of "WAN." While connection control unit 20 is in the WAN connection state 20*w* with connection established with access point 6 or 12 having connection level of "WAN", if connection to the Internet 2 fails, the state changes to the LAN connection state 201 with connection established with access point 6 or 12 having connection level of "LAN."

As described above, in game machine 10 in accordance with the present invention, the information of connection request received by reception unit 20*a* is compared with the information of connection status of access point 6 or 12, whether or not connection is to be established between that program among the plurality of programs 14, 16 and 18 which made the connection request and access point 6 or 12 is determined by determination unit 20*b*, and based on the result of determination by determination unit 20*b*, the process for connecting program 14, 16 or 18 that made the connection request to access point 6 or 12 is performed by connection processing unit 20*c*. Therefore, even when connection requests are output from a plurality of programs 14, 16 and 18 to connect to a plurality of access points 6 and 12 of different types and different connection levels, it is possible to process the connection requests from the plurality of programs 14, 16 and 18 and to connect the game machine 10 to access points 6 and 12.

Further, in game machine 10 in accordance with the present embodiment, since connection control unit 20 controls connection between programs 14, 16 and 18 and access points 6 and 12, it is possible to perform, for example, a process for connecting to access point 6 or 12 and for exchanging necessary information, even when program 14, 16 or 18 is not executed.

In the present embodiment, the process for receiving the connection request for connection to any of access points 6 and 12 from programs 14, 16 and 18, the process for comparing the information of connection request with the information of connection status of access points 6 and 12 and determining whether or not connection is to be established between the program that made the connection request and any of access points 6 and 12, and the process for establishing connection between the program that made the connection request and any of access points 6 and 12 based on the result of determination are executed by one game machine 10. The foregoing is not limiting, and these processes may be executed shared among a plurality of communicable information processing apparatuses.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium comprising a computer readable information processing program, executable by a processor of an information processing apparatus, said information processing apparatus configured to execute at least first and second programs in parallel, said computer readable information processing program causing the processor to:

receive a connection request for connection to an access point from at least said first and/or second program(s) being executed by the processor of the information processing apparatus;

compare information of the connection request received from at least said first program with information of connection status to said access point of at least said second program, and thereby determine whether or not that the program which made the connection request is to be connected to said access point; and perform a connection process for connecting the program that made the connection request to said access point, based on the result of the determination, wherein performing the connection process includes, after connecting a program which made a first connection request to the access point, upon receiving a second connection request from another program, connecting both programs to the access point when the second connection request matches an existing connection.

2. The non-transitory storage medium according to claim 1, wherein said computer readable information processing program causing the processor to:

determine, when said first program is connected to said access point, whether said second program is to be connected to said access point, in response to a connection request from said second program for connection to said access point.

3. The non-transitory storage medium according to claim 2, wherein said computer readable information processing program causing the processor to:

compare a type of said access point included in the information of said connection request with a type of said access point included in the information of said connection status, and thereby determine whether said second program is to be connected to said access point.

4. The non-transitory storage medium according to claim 3, wherein said computer readable information processing program causing the processor to:

notify, when said second program is connected to said access point, said second program of the connection to said access point.

5. The non-transitory storage medium according to claim 2, wherein said computer readable information processing program causing the processor to:

determine, when said first program is connected to a first access point, whether a disconnection process for disconnecting connection between said first program and said first access point is to be performed, in response to a connection request from said second program for connecting to a second access point; and perform the disconnection process for disconnecting the connection between said first program and said first access point based on a result of execution of determining, when said first program is connected to the first access point, whether the disconnection process for disconnecting connection between said first program and said first access point is to be performed, in response to the connection request from said second program for connecting to the second access point.

6. The non-transitory storage medium according to claim 5, wherein said computer readable information processing program causing the processor to:

perform a connection process for connecting said second program and said second access point, after the disconnection process for disconnecting the connection between said first program and said first access point is done by the execution of performing the disconnection process for disconnecting.

7. The non-transitory storage medium according to claim 5, wherein said computer readable information processing program causing the processor to:

compare, when said first program is connected to said access point, in response to a connection request from said second program for connection to said access point, priority of said second program included in the information of said connection request with priority of said first program included in the information of said connection status, and thereby determine whether said first program is to be disconnected from said access point.

8. The non-transitory storage medium according to claim 2, wherein said computer readable information processing program causing the processor to:

compare, when said first program is connected to said access point, in response to a connection request from said second program for connection to said access point, priority of said second program included in the information of said connection request with priority of said first program included in the information of said connection status, and thereby determine whether said second program is to be connected to said access point.

9. The non-transitory storage medium according to claim 8, wherein said computer readable information processing program causing the processor to:

determine the priority of said first and second programs depending on whether a program is running on a background of a computer or on a foreground of said computer, and to give higher priority to the program running on the foreground of said computer than the program running on the background of said computer.

10. The non-transitory storage medium according to claim 8, wherein said computer readable information processing program causing the processor to:

give higher priority, if said first and second programs are both programs running on the background of a computer or both programs running on the foreground of said computer, to that program which is connected to said access point later.

11. The non-transitory storage medium according to claim 8, wherein said computer readable information processing program causing the processor to:

determine, when said first program running on the foreground is connected to said access point, in response to a connection request from said second program running on the background for connection to said access point, a type of said access point included in the information of said connection request; and determine, if the type of said access point included in the information of said connection request does not include the type of said access point included in the information of said connection status, not to connect said second program to said access point.

12. The non-transitory storage medium according to claim 8, wherein said computer readable information processing program causing the processor to:

determine, when said first program running on a foreground is connected to said access point, in response to a connection request from said second program running on a background for connection to said access point, a type of said access point included in said connection request, and determine, when the type of said access point included in the information of said connection request includes the type of said access point included in the information of said connection status, to connect said second program to said access point.

13. The non-transitory storage medium according to claim 8, wherein said computer readable information processing program causing the processor to:

determine, when said first program running on a background is connected to said access point, in response to a connection request from said second program running on a foreground for connection to said access point, a type of said access point included in the information of said connection request, and determine, when the type of said access point included in the information of said connection request does not include the type of said access point included in the information of said connection status, to connect said second program to said access point.

14. The non-transitory storage medium according to claim 8, wherein said computer readable information processing program causing the processor to:

determine, when said first program running on a background is connected to said access point, in response to a connection request from said second program running on a foreground for connection to said access point, a type of said access point included in the information of said connection request, and determine, when the type of said access point included in the information of said connection request includes the type of said access point included in the information of said connection status, to connect said second program to said access point.

15. The non-transitory storage medium according to claim 1, wherein said computer readable information processing program causing the processor to:

perform, when said first and second programs are connected to said access point, a disconnection process for disconnecting the connection from said access point, in response to disconnection requests for disconnecting the connection to said access point, from said first and second programs.

16. The non-transitory storage medium according to claim 1, wherein said first and second programs are stored in a memory housed within the information processing apparatus.

17. The non-transitory storage medium according to claim 1, wherein the connection process includes a process for establishing a data connection between the information processing apparatus and the access point.

18. An information processing apparatus having at least one processor and configured to execute at least first and second programs in parallel, the information processing apparatus configured to:

receive a connection request for connection to an access point from at least said first and/or second program(s) being executed by the processor of the information processing apparatus;

compare information of the connection request received from at least said first program with information of connection status of said access point of at least said second program, and thereby determine whether that the program which made said connection request is to be connected to said access point; and perform a connection process for connecting the program that made said connection request to said access point, based on a result of the determination, wherein performing the connection process includes, after connecting a program which made a first connection request to the access point, upon receiving a second connection request from another program, connecting both programs to the access point when the second connection request matches an existing connection.

19. An information processing system configured to execute at least first and second programs in parallel, comprising:

a processing system having at least one processor, the processing system configured to:

receive a connection request for connection to an access point from at least said first and/or second program(s) being executed by the processor of the processing system;

compare information of the connection request received from at least said first program with information of connection status of said access point of at least said second program, and thereby determine whether that the program which made said connection request is to be connected to said access point; and perform a connection process for connecting the program that made said connection request to said access point, based on a result of the determination, wherein performing the connection process includes, after connecting a program which made a first connection request to the access point, upon receiving a second connection request from another program, connecting both programs to the access point when the second connection request matches an existing connection.

20. A method implemented in an information processing apparatus having at least one processor and configured to execute at least first and second programs in parallel, the method comprising:

receiving a connection request for connection to an access point from at least said first and/or second program(s) being executed by the processor of the information processing apparatus;

comparing information of the connection request received from at least said first program with information of connection status of said access point of at least said second program, and thereby determining whether that the program which made said connection request is to be connected to said access point; and performing a connection process for connecting the program that made said connection request to said access point, based on a result of the determination, wherein performing the connection process includes, after connecting a program which made a first connection request to the access point, upon receiving a second connection request from another program, connecting both programs to the access point when the second connection request matches an existing connection.

21. A non-transitory storage medium comprising a computer readable information processing program, executable by a processor of an information processing apparatus, said information processing apparatus configured to execute at least first and second programs in parallel, said computer readable information processing program causing the processor to:

connect the first program, executing in said information processing apparatus, to an access point based on a first connection request from said first program;

receive a second connection request for connection to the access point from at least said second program executing in said information processing apparatus in parallel with said first program;

determine which program should have a higher priority for connecting to said access point based on, at least, whether said first and second programs are executing as a background process or a foreground process; and connect the second program making said connection request to said access point when said second program is determined to have a higher priority than said first program, wherein after connecting the first program which made the first connection request to the access point, upon receiving the second connection request from the second program, connecting both programs to the access point when the second connection request matches an existing connection.

22. The non-transitory storage medium according to claim 21, wherein which program that should have the higher priority is determined based on, at least, a type of said access point included in the connection request from the second program.

23. The non-transitory storage medium according to claim 21, wherein when the first program is running in a foreground of said information processing apparatus and when the second program is running in a background of said information processing apparatus, the first program is assigned the higher priority than the second program.

* * * * *